United States Patent [19]
Kikuchi et al.

[11] Patent Number: 5,478,156
[45] Date of Patent: Dec. 26, 1995

[54] PRINTER HAVING PRINT DATA ARITHMETIC LOGIC

[75] Inventors: Hiroshi Kikuchi; Katsuyuki Ito; Shinichi Katakura; Jiro Tanuma; Hiroshi Okada; Kazuhiko Nagaoka; Akira Nagumo, all of Tokyo, Japan

[73] Assignee: Oki Electric Industry Co., Ltd., Tokyo, Japan

[21] Appl. No.: 106,199

[22] Filed: Aug. 13, 1993

Related U.S. Application Data

[63] Continuation of Ser. No. 788,272, Nov. 5, 1991, abandoned.

[30] Foreign Application Priority Data

| Nov. 6, 1990 | [JP] | Japan | 2-299010 |
| Dec. 7, 1990 | [JP] | Japan | 2-400881 |
| Dec. 17, 1990 | [JP] | Japan | 2-402653 |
| Feb. 12, 1991 | [JP] | Japan | 3-018956 |

[51] Int. Cl.$^6$ ................................. H04N 1/387
[52] U.S. Cl. ......................... 400/120.01; 358/298
[58] Field of Search ............. 400/120.01, 120.07, 400/120.09; 358/296, 298; 395/128

[56] References Cited

U.S. PATENT DOCUMENTS

| 4,437,122 | 3/1984 | Walsh et al. | 358/166 |
| 4,544,264 | 10/1985 | Bassetti | 358/300 |
| 4,835,551 | 5/1989 | Ng | 358/296 |
| 5,025,322 | 6/1991 | Ng | 358/298 |
| 5,105,202 | 4/1992 | Hewes | 346/107 R |
| 5,115,252 | 5/1992 | Sasaki | 358/298 |
| 5,134,495 | 7/1992 | Frazier et al. | 358/298 |
| 5,155,598 | 10/1992 | Ramelars | 358/298 |
| 5,193,008 | 3/1993 | Frazier et al. | 358/298 |

FOREIGN PATENT DOCUMENTS

| 0110180 | 6/1984 | European Pat. Off. | 358/298 |
| 0217447 | 4/1987 | European Pat. Off. | 358/298 |
| 0311111 | 4/1989 | European Pat. Off. | 358/298 |

*Primary Examiner*—Edgar S. Burr
*Assistant Examiner*—Steven S. Kelley
*Attorney, Agent, or Firm*—Spencer, Frank & Schneider

[57] ABSTRACT

A printer includes a controller for providing a sequence control for the printer in its entirety in response to a control signal and a video signal from another controller. A printer head is adapted for latching and printing a printing data signal transmitted from the controller. Print data arithmetic and logic circuitry provides a logical operation processing for video data signals, counting video clock signals transmitted from the controller, and includes storage for storing the video data signals transmitted from the controller, a selector responsive to reference line timing signals for selectively alternately outputting the video data signals, an additional line signal generator for generating from video signals received from the controller, a video data signal representing an additional line destined for between reference lines during an interval of timing, and logical operation circuitry for performing a logical operation for the video data signals read out from the storage and supplying to the printer head the video data signals subjected to the logical operation in the form of the printing data signal.

20 Claims, 23 Drawing Sheets

PRINTER HAVING PRINT DATA ARITHMETIC LOGIC

This application is a continuation of application Ser. No. 07/788,272, filed Nov. 5th, 1991, now abandoned.

BACKGROUND OF THE INVENTION

1. Field of the Invention

The present invention relates to a non-impact printer, and more particularly to a printer wherein a printing is performed in a dot configuration on each line perpendicular to a sheet running direction.

2. Description of the Prior Art

Hitherto, in a non-impact printer such as an electrophotographic printer, an electrically charged photoconductor drum is illuminated by with a light source to form an electrostatic latent image on a surface thereof, a developing is performed upon adhesion of a toner to the electrostatic latent image, to form a toner image, and then the thus obtained toner image is transferred to a recording material to be fixed thereon.

FIG. 2 is a block diagram of a printer control circuit in a conventional non-impact printer. In FIG. 2, a control unit 1 transmits, at the time point that a sheet arrives at a printing ready point, a timing signal 12, including a line and a raster timing signal, to another controller, and receives a video signal 11 which has been edited on each page in the other controller. The received video signal 11 in the control unit 1 is transmitted to a print head 19 in the form of a real printing data signal 18. Upon receipt of a line of video signal 11, the control unit 1 transmits a latch signal 17 to a print head 19 so as to hold the real printing data signal 18 therein. Before receiving the subsequent data from the other controller, the thus held real printing data signal 18 is visualized in print when the print head 19 receives a printing drive signal 13.

Transmission and receipt operations of the video signal 11 are performed in units of print lines. FIG. 3 is an operational time chart of the conventional non-impact printer as mentioned above. In a case where a tone expression according to the dither pattern is performed, the number of dots to be printed per unit area is increased or decreased in accordance with a density or concentration of the image. In this case, regarding the dots for use the tone expression and the dots constituting part a character, a line and the like, one designs in such a manner that an even energy is given at the time of printing to drive the segments of the print head corresponding to the respective dots.

Further, in case of printing of a character and the like according to the non-impact printer as mentioned above, it is necessary to form a continuous line, and thus in accordance with such a printer, adjacent dots are printed on an overlapping basis, but not to form individual dot trains. For example, the a case where printing data representing dots as shown in FIGS. 6 and 8 are arranged, the adjacent dots are in fact printed to overlap one another, as shown in FIGS. 7 and 9, respectively.

However, according to the conventional non-impact printer as mentioned above, in a case where a slash extending in a lateral direction is printed, the printed slash provides, as shown in FIG. 4, a polygonal or broken line-like image rather than a straight line-like image, in view of a relation between a raster interval and a dot interval.

Also, as shown in FIG. 5, in the case where printing is performed as a dashed or broken line coupling dot D1 with dot D5, dot D3 forms a straight line-like image since it locates on a lattice L20 of a basic raster line 102. However, there are not any suitable dot positions for interpolation between dots D1 and D3 and also between dots D3 and D5, so that dots D2 and D4 are actually printed thereby providing a polygonal line-like image. Similarly, in a case where printing is performed as a broken line coupling dot D6 with dot D10, dot D8 forms a straight line-like image together therewith. However, dots D7 and D9 result in providing a polygonal line-like image.

Further, according to the conventional non-impact printer as mentioned above, there is designed such a printer that an even energy is given in both of the cases of printing of the dots for use in the tone expression and printing of the dots constituting part of a character, a line and the like. Thus, if an optimum driving energy is set for one of the printings, a driving energy for the other printing is not an optimum value. As a consequence, the tone expression is far from the ideal one, thereby becoming dark.

Furthermore, in the case where a high duty printing is performed in accordance with the conventional non-impact printer of the type mentioned above, that is, in a case where a printing is performed which is extremely full of the number of dark dots in a printed picture, such as a reversed printing, the area of a non-printed part is small so that an unfocused image and discontinuity would occur.

SUMMARY OF THE INVENTION

It is therefore an object of the present invention, in view of the foregoing problems, to provide an improved printer.

It is another object of the present invention to provide a non-impact printer capable of outputting a slash printing by dot width image data in the form of a linear or straight line-like image.

It is still another object of the present invention to provide a non-impact printer capable of setting an optimum driving energy in both of the cases of printing of the dots for use in the tone representation and printing of the dots constituting part of a character, a line and the like, thereby providing a good printing quality avoiding ambiguity of non-printing part even in the case of a high duty printing.

In accordance with the present invention, a printer comprises a control means for providing a sequence control for the printer in its entirety in response to a control signal and a video signal from another controller, a print head adapted for latching and printing a printing data signal transmitted from the control means, and a print data arithmetic and logic circuit means for providing a logical operation processing for video data signals transmitted from the control means. The print data arithmetic and logic circuit means includes storage means for storing the video data signals transmitted from the control means, and a logical operation circuit for performing a logical operation for the video data signals read out from the storage means and supplying to the print head the video data signals subjected to the logical operation in the form of the printing data signal.

In accordance with a preferred embodiment of the present invention, there is disclosed a non-impact printer provided with control means for providing a sequence control for the printer in its entirety in response to a control signal and a video signal from another controller, comprising a first memory for storing now entered video data signal on a current line; a second memory for storing a video data signal before one line; means for generating reference line timing signals; means for generating an additional line signal during an interval of a receiving timing of the reference line timing signals; selection means responsive to the reference line timing signal for selectively alternately outputting the video data signal to the first and second memories; a logical operation circuit for performing a logical operation for the video data signals stored in the first and second memories in accordance with a given logical expression, the logical operation circuit outputting the data signals subjected to the logical operation in the form of real printing data signals, and outputting the data signals not subjected to the logical operation in the form of the real printing data signals when receiving the additional line signal; and a print head for performing a printing upon receipt of the real printing data signals from the logical operation circuit and a printing drive signal from the control means.

In accordance with another preferred embodiment of the present invention, there is disclosed a non-impact printer provided with a control means for providing a sequence control for the printer in its entirety in response to a control signal and a video signal from another controller, comprising an N-line buffer for storing N pieces of line of video data signals in units of lines, N being a natural number; means for generating reference line timing signals; means for generating an additional line signal during an interval of a receiving timing of the reference line timing signals; selection means responsive to the reference line timing signal for selectively outputting the video data signal to the N-line buffer; a logical operation circuit for performing a logical operation for the video data signals stored in the N-line buffer in accordance with a given logical expression, the logical operation circuit responsive to the additional line signal outputting the data signals subjected to the logical operation in the form of real printing data signals; and a print head for performing a printing upon receipt of the real printing data signal from the logical operation circuit and a printing drive signal from the control means. In the printer, the real printing data signal comprises a component for printing a dot on a basic raster line and a component for printing a dot on an additional raster line to be set between the basic raster lines.

In accordance with a further preferred embodiment of the present invention, there is disclosed a non-impact printer provided with control means for providing a sequence control for the printer in its entirety in response to a control signal and a video signal from another controller, comprising an N-line buffer for storing N pieces of line of video data signals in units of lines, N being a natural number; means for generating reference line timing signals; means for generating an additional line signal during an interval of a receiving timing of the reference line timing signals; selection means responsive to the reference line timing signal for selectively outputting the video data signal to the N-line buffer; a logical operation circuit for comparing raster data on a specific area formed based on the video data signals in the N-line buffer with a dot pattern which has been previously defined in the logical operation circuit and performing a logical operation in accordance with a result of comparison, the logical operation circuit outputting the data signals subjected to the logical operation in the form of real printing data signals, when receiving the additional line signal; and a print head for performing a printing upon receipt of the real printing data signal from the logical operation circuit and a printing drive signal from the control means. In the printer, the real printing data signal comprises a component for printing a dot on a basic raster line and a component for printing a dot on an additional raster line to be set between the basic raster lines.

In accordance with a still further preferred embodiment of the present invention, there is disclosed a printer wherein a printing is performed in a dot configuration on each line substantially perpendicular to a sheet running direction, comprising a storage means for storing a plurality of lines of basic print data to be printed on lines; an additional print data producing means for producing additional print data to be printed between the lines based on the plurality of lines of basic print data read out from the storage means; and a timing producing means for producing timing for printing the additional print data produced by the additional print data producing means.

BRIEF DESCRIPTION OF THE DRAWINGS

The objects and features of the present invention will become more apparent from the consideration of the following detailed description taken in conjunction witch the accompanying drawings in which.

DESCRIPTION OF THE PREFERRED EMBODIMENTS

Figure 10:
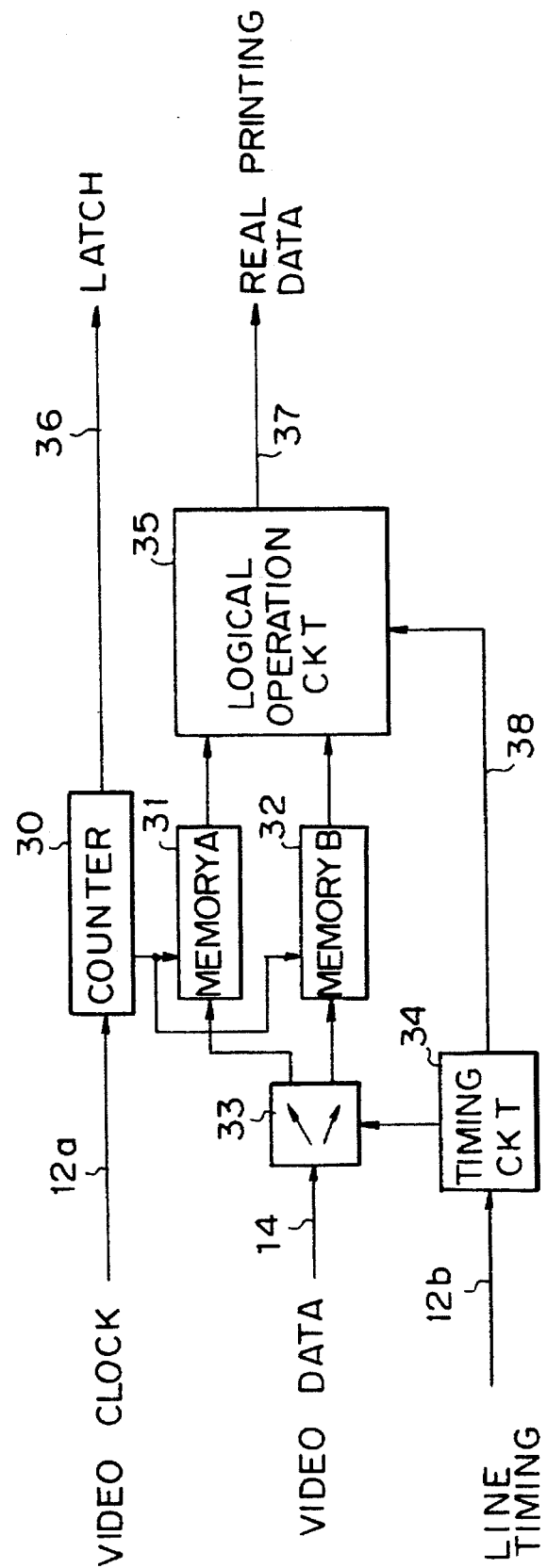
FIG. 10 is a schematic block diagram showing a print data arithmetic and logic circuit included in the embodiment shown in FIG. 1.
Figure 11:
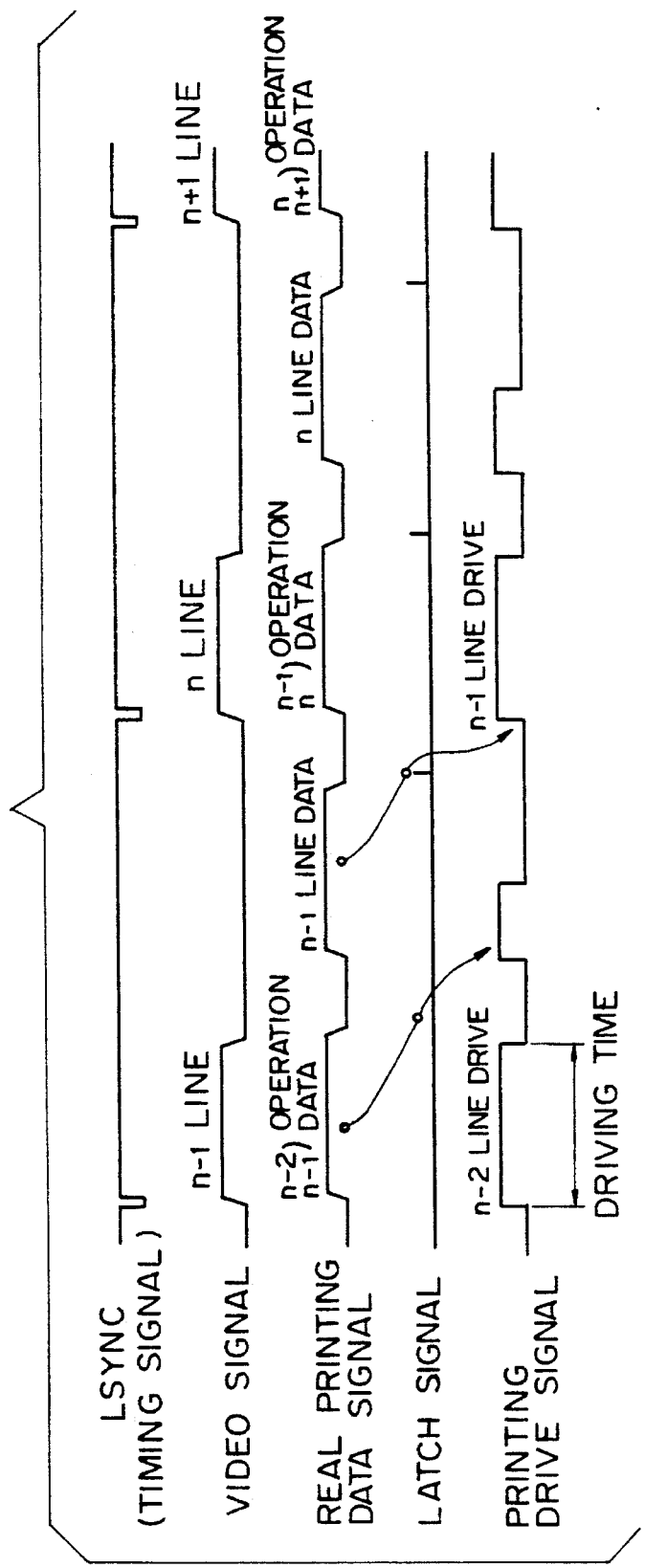
FIG. 11 is an operational time chart useful for understanding the printer unit control circuit according to the embodiment of the present invention.
Figure 12:
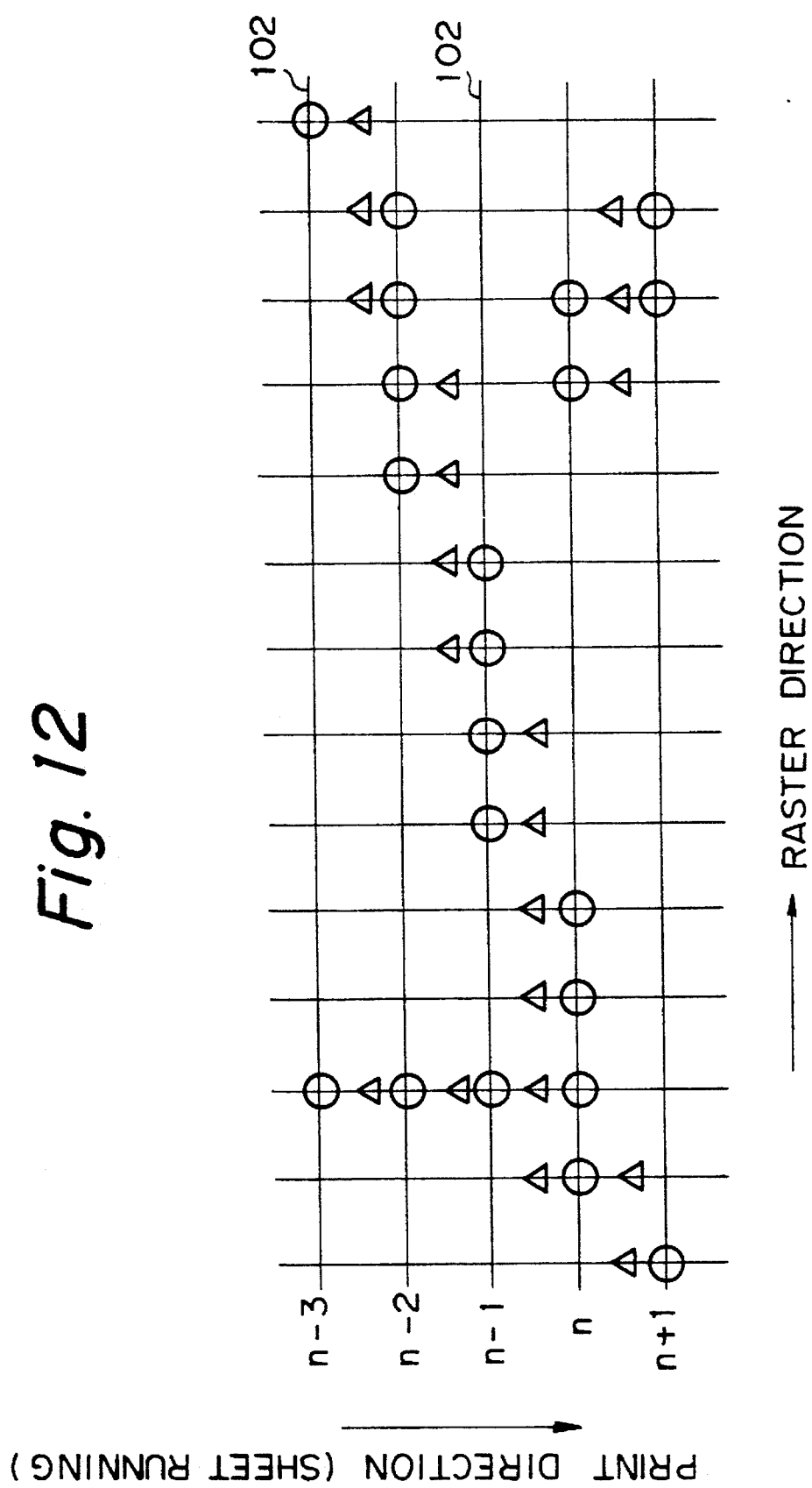
FIG. 12 is a view schematically showing a printed result according to the non-impact printer of the present invention.

The preferred embodiments of a printer of the invention will be described with reference to the drawings in detail which include FIG. 1, a block diagram of a printer Control circuit in a non-impact printer according to an embodiment of the present invention, FIG. 10, a block diagram of a print data arithmetic and logic circuit, FIG. 11, an operational time chart for explanation of the printer unit control circuit, and FIG. 12, a view showing a printed result according to the non-impact printer of the present invention. In FIG. 12, a circle and a triangle denote reference and additional raster data, respectively.

Figure 1:
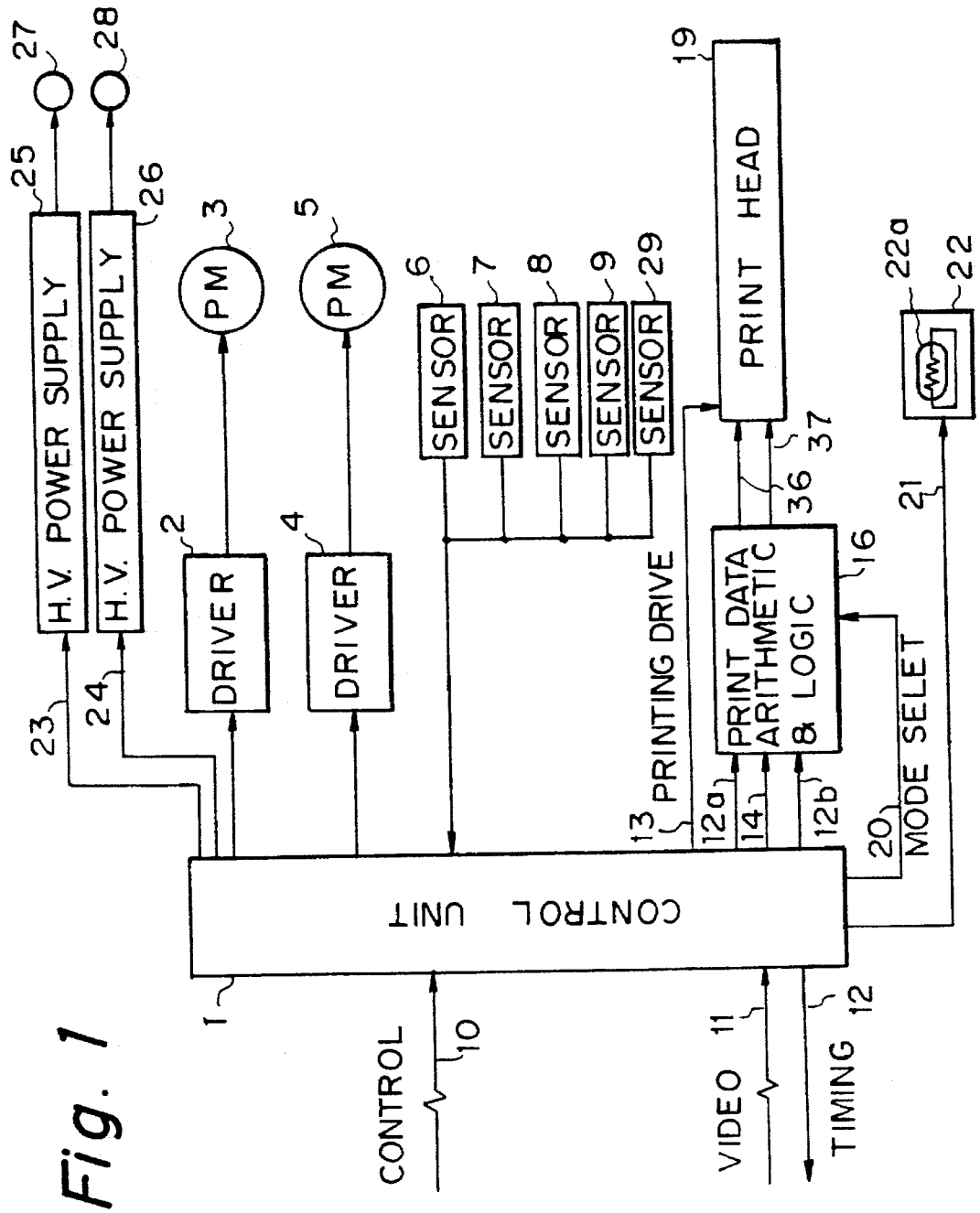
FIG. 1 is a schematic block diagram of a printer unit control circuit of a non-impact printer according to a preferred embodiment of the present invention.
Figure 2:
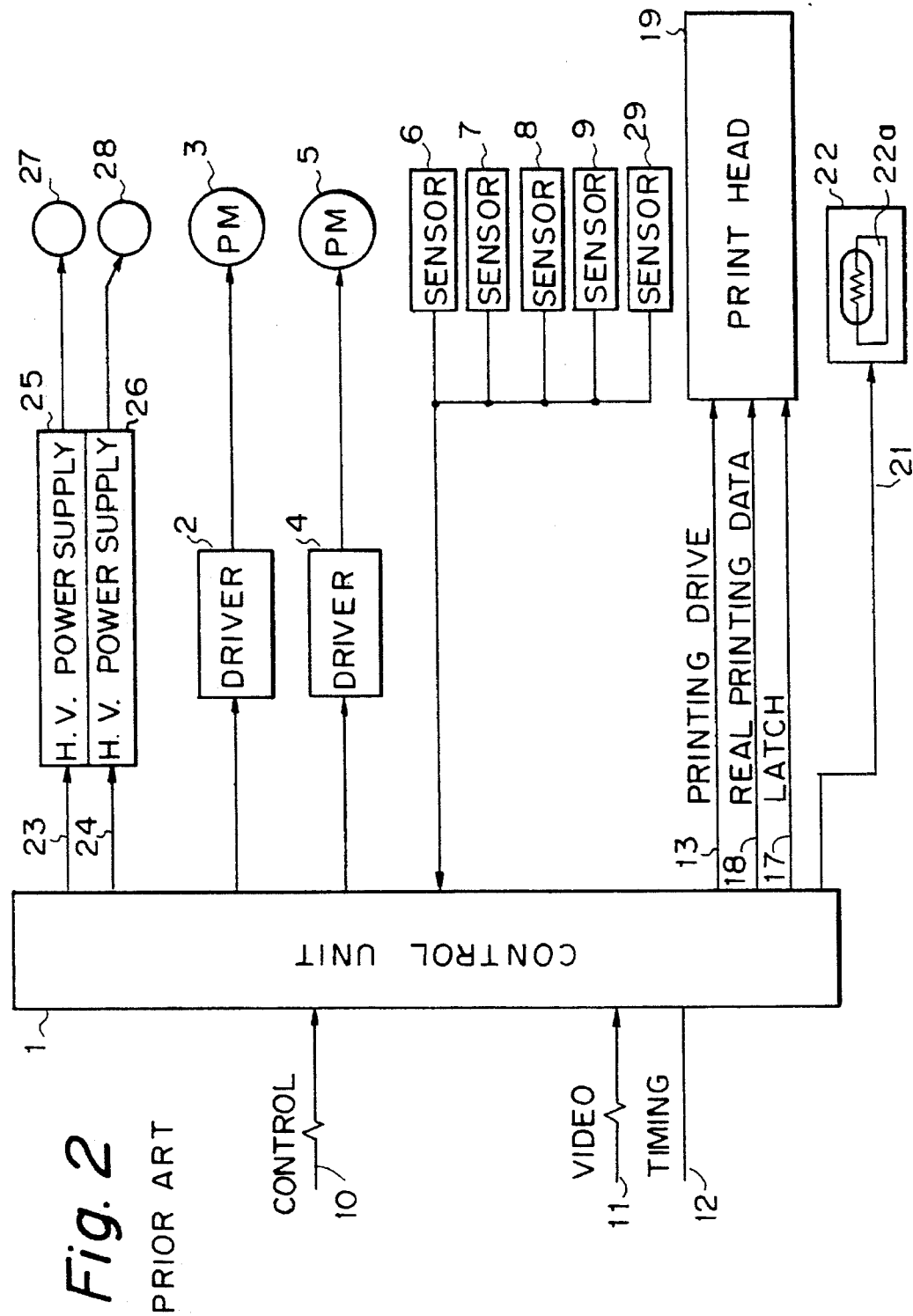
FIG. 2 is a schematic block diagram showing a printer unit control circuit of a conventional non-impact printer.
Figure 3:
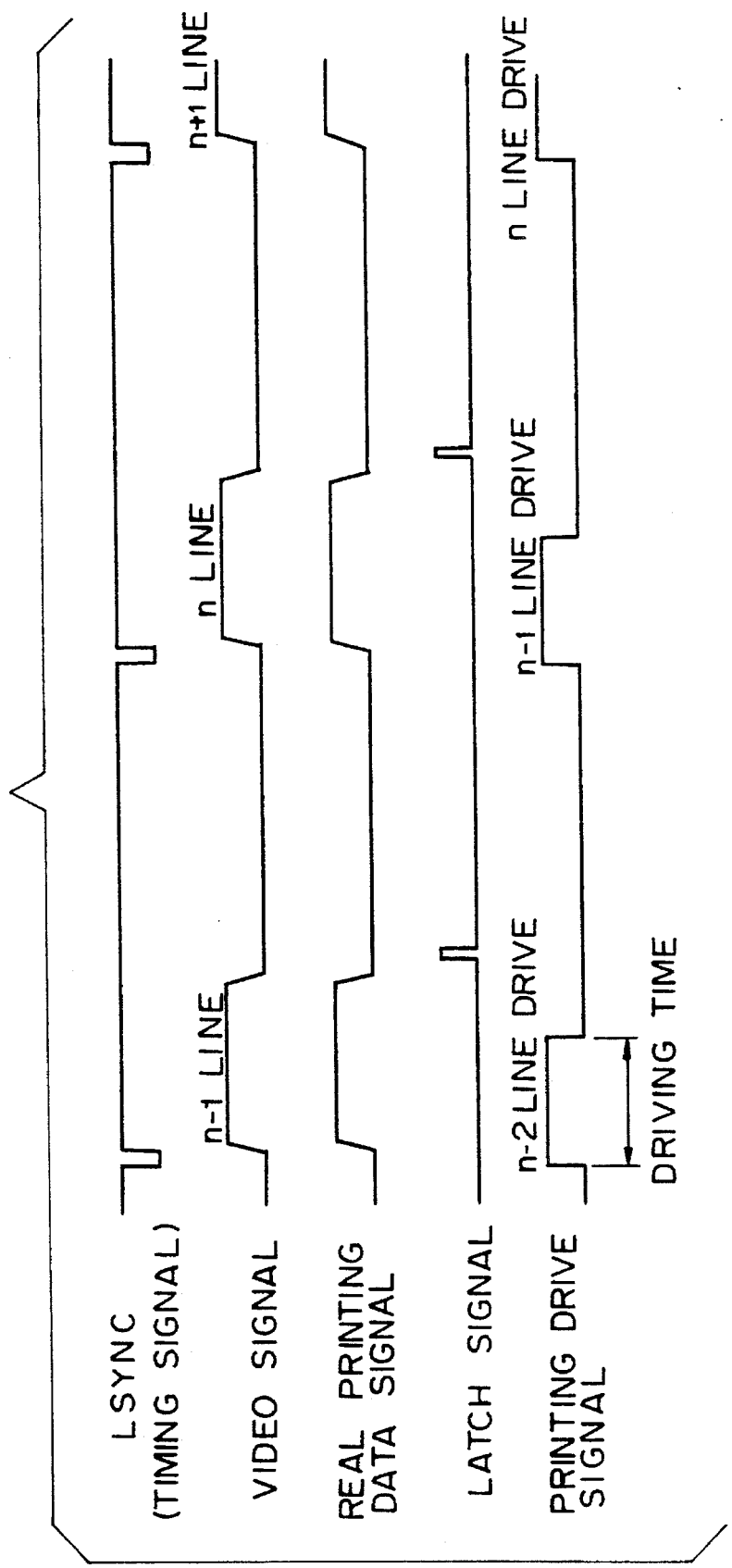
FIG. 3 is a time chart useful for explanation of the conventional non-impact printer.
Figure 4:
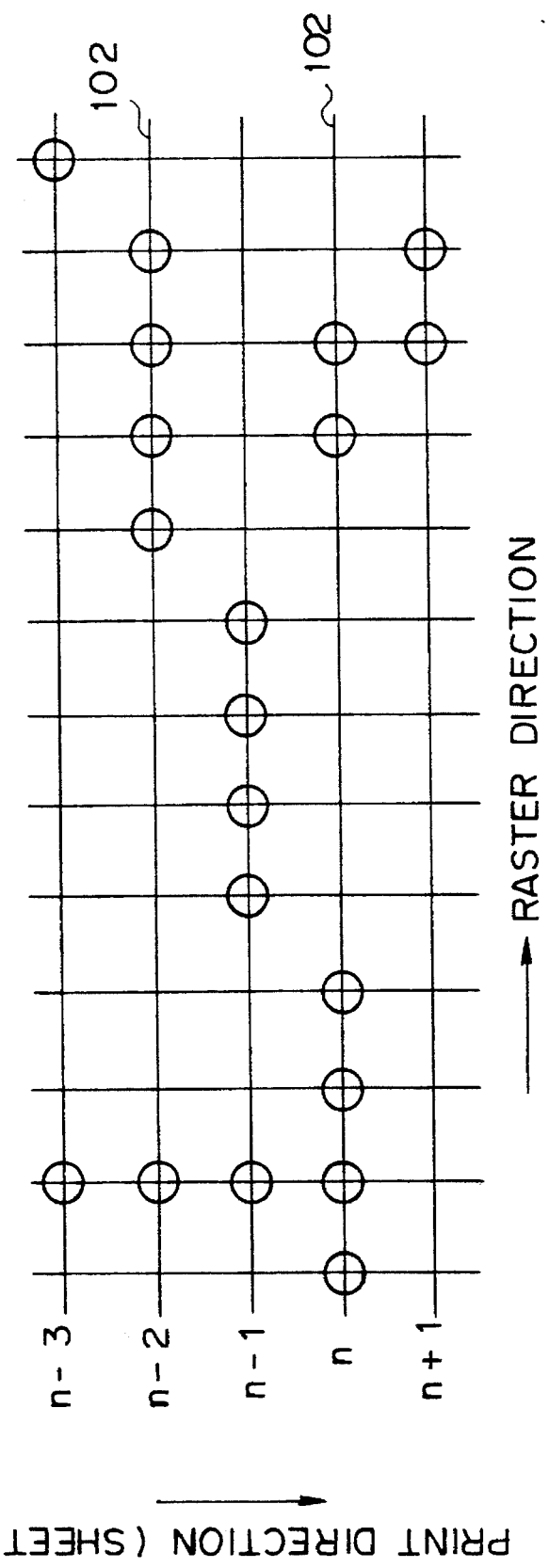
FIGS. 4 and 5 are views showing printed results according to the non-impact printer.

In FIG. 1, a control unit or main control 1 comprises a microprocessor, a ROM, a RAM, input/output ports, a timer and similar components, of the embodiment, and is provided inside of a printing unit of a printer. The control unit 1 provides a sequence control for the printer in its entirety in response to control signals 10 and a video signal 11 from another controller, not shown. Upon receipt of a print instruction included in the control signals 10, the control unit 1 first causes a fuser temperature sensor 29 to sense whether or not a fuser 22 including a heater 22a is in an available temperature range, and if not, turns on the heater 22a timed with signal 21 to heat the fuser 22 up to an available temperature. Next, a motor (PM) 3 for development/transfer process is driven through a driver 2 and simultaneously a high voltage power source 25 for charging is turned on in response to a charge trigger signal 23 to perform charging of a developing unit 27.

The sort of setting sheet is determined on the basis of the results from a sheet remaining amount sensor 8 and a sheet size sensor 9 to start feeding sheets corresponding to the sort of sheet thus sensed. A motor (PM) 5 for sheet feed is able to rotate in two directions through a driver 4. The motor 5 first rotates in reverse to carry the setting sheet by a predetermined amount until a sheet inhalation inlet sensor 6 senses the sheet, and subsequently, regularly rotates to transfer the sheet to a printing device of the inside of the printer.

The control unit 1 transmits, at the point of time that the sheet arrives at a printing ready point, a timing signal 12, including a line timing signal and a raster timing signal, to the other controller, not shown, and receives a video signal. The received video signal 11 is transmitted through the control unit 1 to a print data arithmetic and logic circuit 16.

The print data arithmetic and logic circuit 16 will be described hereinafter with reference to FIG. 10. When line timing signals (LSYNC) 12b, which are generated in units of print lines in the control unit 1, are applied to a timing circuit 34, the timing circuit 34 transmits selection signals to a selection circuit 33. Upon receipt of the selection signals, the selection circuit 33 causes video data signals 14 to be stored in memory A 31 or memory B 32 in order. Addresses for storage are generated by means of counting video clock signals 12a supplied from the control unit 1 by a counter 30.

Now assuming that the entered video data signal 14 has been stored in the memory A 31, stored in a storage location of the memory B 32 addressed by the counter 30 is the video data signal 14 of the same raster bit before one line. Thus, applied to a logical operation circuit 35 are the video data signal 14 before one line from the memory B 32 and the video data signal 14 presently stored in the memory A 31, so that an operation result is transmitted in the form of a real printing data signal to a print head 19. After a line of real printing data signal 37 is transferred, a latch signal 36 is transmitted to the print head 19 so as to hold the real printing data signal 37 therein. The logical operation circuit 35 may be constructed with a delay circuit, an OR circuit, an AND circuit and the like, and produces, in a timing of receipt of the video data signal, additional raster N-th bit (N is a natural number) of real printing data signal 37 given by a logical equation as set forth below:

$$X_{n-n+1}(N) = X_n(N) \cdot (X_{n+1}(N-1) + X_{n+1}(N) +$$

$$X_{n+1}(N+1)) + X_{n+1}(N) \cdot (X_{n-1}(N-1) +$$
$$X_n(N) + X_n(N+1)) + (X_n(N-1) \cdot X_n(N) \cdot$$
$$X_n(N+1) \cdot (X_{n+1}(N-2) + X_{n+1}(N+2)) +$$
$$(X_{n+1}(N-1) \cdot X_{n+1}(N) \cdot X_{n+1}(N+1)) \cdot$$

$$(X_n(N-2) + X_n(N+2))$$

More specifically, additional dots are provided in such cases where (1) there is a dot at the same raster point on lines before and/or after a line of interest, (2) there is a dot at the raster point displaced left and/or right by one dot in a raster direction on lines before and/or after a line of interest, and (3) there are dots at three successive raster points on a line of interest and in addition there is a dot at the raster point displaced left and/or right by two dots from the center in a raster direction on lines before and/or after a line of interest.

The timing circuit 34 generates an additional printing timing during an interval of a receiving timing of the video signal 11 received from the other controller. More specifically, the line timing signal 12b is frequency divided to output an additional line signal 38 to the logical operation circuit 35. Upon receipt of the additional line signal 38, the logical operation circuit 35 reads out the previously stored video data signal 14 from the memory A 31 and transmits it to the print head 19, without carrying out the logical operation. Thereafter, the latch signal 36 is sent out to hold the real printing data signal 37 in the print head 19.

The thus held real printing data signal 37 is used for printing, when the print head 19 receives a printing drive signal 13 output from the control unit 1, before receiving a real printing data signal 37 on the next line from the logical operation circuit 35.

A printing drive period of time for the printing drive signal 13 is selected, in the case where the real printing data signal 37 subjected to the logical operation is added as an additional raster data for printing, to be shorter to reduce energy compared with that in the case where the real printing data signal 37 transmitted from the other controller is used for printing as it is, so that a smaller diameter of printing dot may be provided thereby avoiding a difference in printing density between both the cases or modes.

Further, the operation of the print data arithmetic and logic circuit 16 may be shifted in accordance with a mode select signal 20 transmitted from the control unit 1, so that the operational processing by the print data arithmetic and logic circuit 16 is prohibited to allow the same printing as the conventional one to be performed.

Information to be printed by the print head 19 is formed on a photoconductor drum, not shown, of which parts are correspondingly charged with negative potential, in the form of an electrostatic latent image with dots elevated in potential. A toner image is in turn formed by providing electrostatic adhesion of a toner charged in negative potential to those dots.

The toner image is transmitted to a transfer section in which the toner image is transferred, by a transfer unit 28 having a high voltage source of a positive potential generated by a high voltage power supply 26 through a transfer signal 24, to a sheet passing through a clearance between the photoconductor drum, not shown, and the transfer unit 28.

The sheet having the toner image transferred is carried in contact with the fuser 22 including the heater 22a, so that the toner image is fixed on the sheet by heat of the fuser 22. The sheet having the image fused is further carried and delivered from the printing device of the printer through a sheet delivery outlet sensor 7 to the outside of the printer.

The control unit 1 is operative, in response to detection of the sheet size sensor 9 and the sheet inhalation inlet sensor 6, to apply the voltage from the high voltage power supply 26 for transferring to the transfer unit 28 only during a period of time when the sheet passes through the transfer unit 28.

When the printing is terminated, and the sheet has completely passed through the sheet delivery outlet sensor 7, power supply of the high voltage power source 25 for charging to the developing unit 27 is terminated and simultaneously rotation of the stepping motor 3 for development/transfer process is stopped.

As stated above in detail, according to the embodiment of the present invention, the logical operation is performed on the basis of the video signal on the present line and the video signal before one line. An additional line signal is generated during an interval of the line timing signal to form the real printing data signal not subjected to the logical operation. A printing is performed in accordance with both the real printing data signal subjected to the logical operation and the real printing data signal not subjected to the logical operation. Thus, according to the present invention, it is possible to provide a natural printing for a curved line, a slash or the like, thereby improving a printing quality.

Further, according to the embodiment of the present invention, the print head is adapted, in a case where an additional raster data is used for printing, to provide a shorter printing drive period of time of the printing drive signal, compared with that in the case where the real printing data signal is used for printing as it is, thereby avoiding a difference in printing density between both the cases or modes.

Next, an alternative embodiment of the print data arithmetic and logic circuit 16 will be described referring to FIG. 13. In the figures, like components are designated by the same reference numerals and redundant description thereon will be avoided. When line timing signals (LSYNC) 12b, which are generated in units of print lines in the control unit 1, they are applied to the timing circuit 34, which in turn transmits selection signals to a selection circuit 33. Upon receipt of the selection signals, the selection circuit 33 causes video data signals 14 to be stored in the selected line storage or buffering locations of an N-line buffer 110 in order. Addresses for storage are generated by the counter 30 counting video clock signals 12a supplied from the control unit 1.

Figure 14:
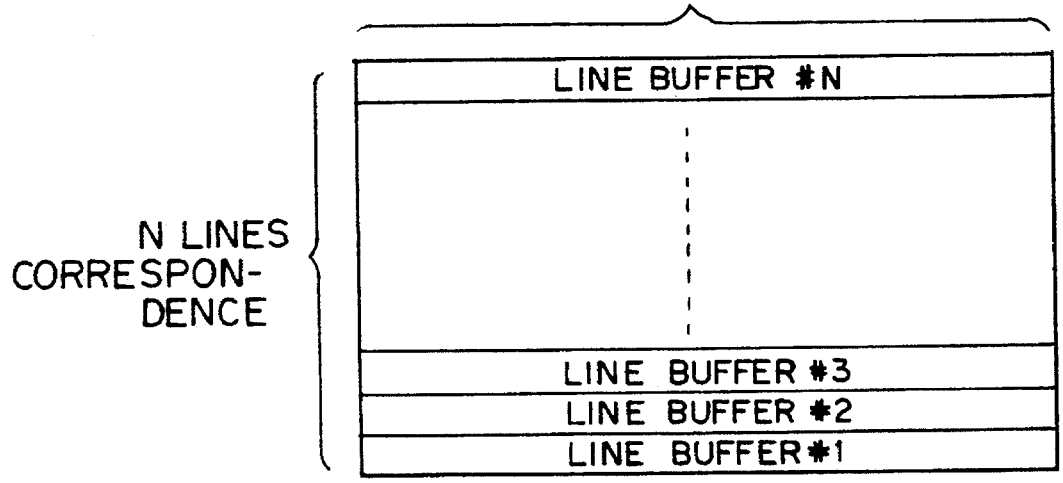
FIG. 14 is an enlarged view showing an N-line buffer shown in FIG. 13.

Now assuming that the entered video data signal 14 has been stored in the N-line buffer 110, as shown in FIG. 14, in line buffering locations #2 to #N of the N-line buffer 110, stored in storage locations addressed by the counter 30 are the video signals 14 to the nearest (N−1) line. In this context, N denotes a natural number.

Applied to a logical operation circuit 35 are N dots of continuous raster data on each of N lines from the N-line buffer 110, so that the logical operation circuit 35 produces, from N×N dots of raster data, data corresponding to the center of the area by means of the logical operation. While the video signal 14, which is entered from the control unit 1, is of a structure for indicating whether dots are to be formed on the basic raster lines determined by resolution of an apparatus, the data produced by the logical operation circuit 35 is of a structure for indicating whether dots are to be formed on the basic raster lines, and in addition indicating whether dots are to be formed on x pieces of additional raster line between the basic raster lines. The thus produced data are transmitted in the form of the real print data signal 37 to the print head 19.

Figure 15:
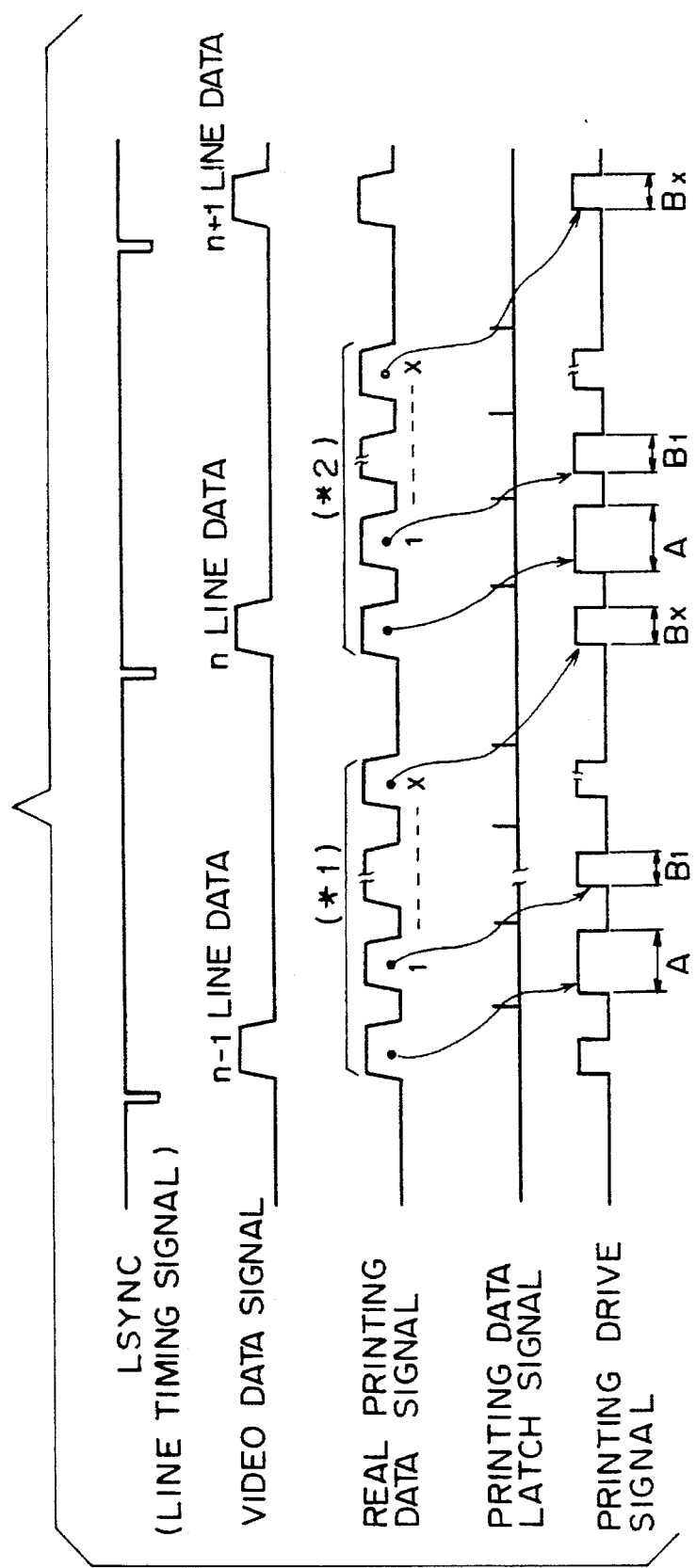
FIG. 15 is an operational time chart useful for explanation of the printer unit control circuit according to the alternative embodiment of the present invention.

FIG. 15 shows the timing of the printer unit control circuit, in which N denotes the number of line buffers in the print data arithmetic and logic circuit 16. In the figure, *1 denotes the {n−1−(N+1)/2} th line of data obtained by a logical operation with data from the {n−N−1} th line to {n−2} th line with the number of additional raster lines being x. Also, *2 denotes the {n−(N+1)/2} th line of data obtained by a logical operation with data from the {n−N} th line to the {n−1} th line with the number of additional raster lines being x. In the figure, A indicates a driving time in the case of printing of a dot on a basic raster line. B1, B2 ... , Bx denote driving periods of time in the case of printing a dot on respective additional basic raster lines.

In FIG. 15, video data signals 14, which are transmitted from the control unit 1 on a line-by-line basis, are transferred in units of lines. The real print data signal 37 includes data involved in the basic raster lines and the added x pieces of additional raster line. Driving energy in a printing drive period of time is independently set between the case where data on the basic raster lines 102 are driven and the case where data on the x added pieces of additional raster line are driven. A circuit for performing such a function is included in the control unit 1. Setting of the longer printing drive period of time provides the longer exposure time for a surface of the photoconductor drum, and thus an amount of electric charge discharged from the surface of the photoconductor drum becomes large in accordance with an amount of exposure, so that an amount of deposited toner becomes large, thereby providing a large dot diameter.

Figure 5:
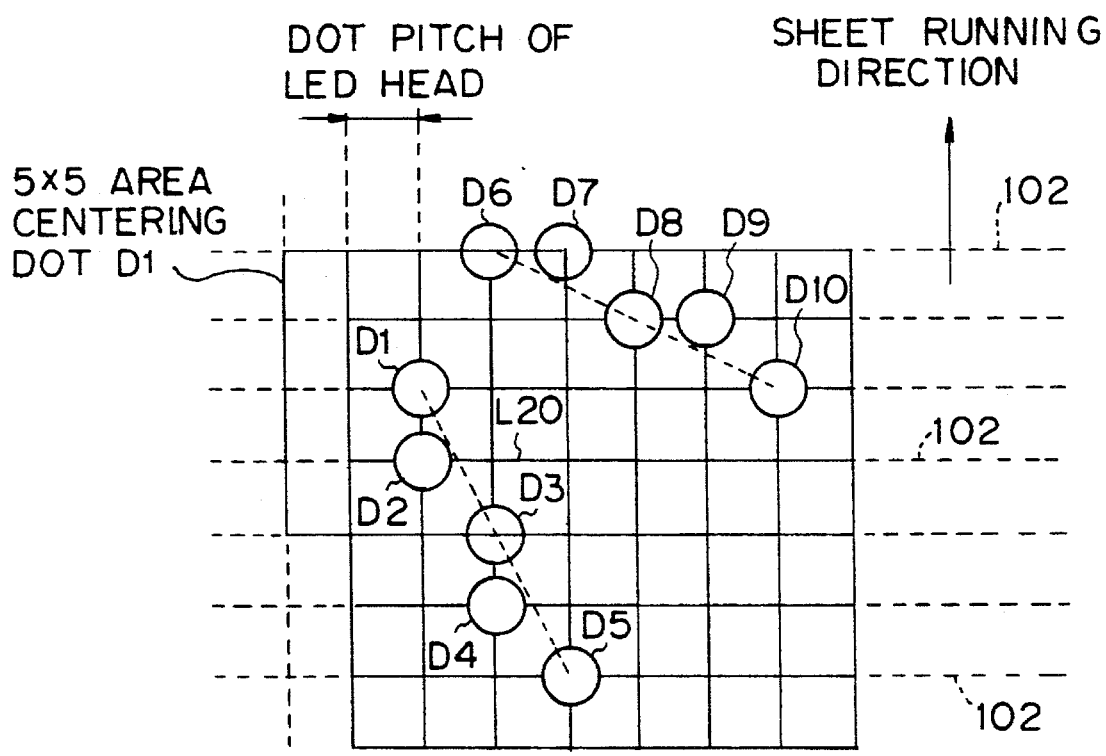
Figure 6:
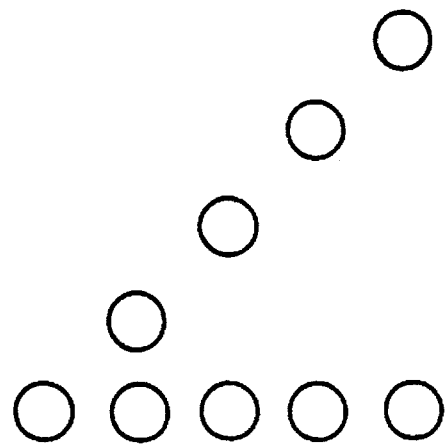
FIG. 6 is a view schematically showing printing data representative of dots in the case of the usual printing according to a non-impact printer.
Figure 7:
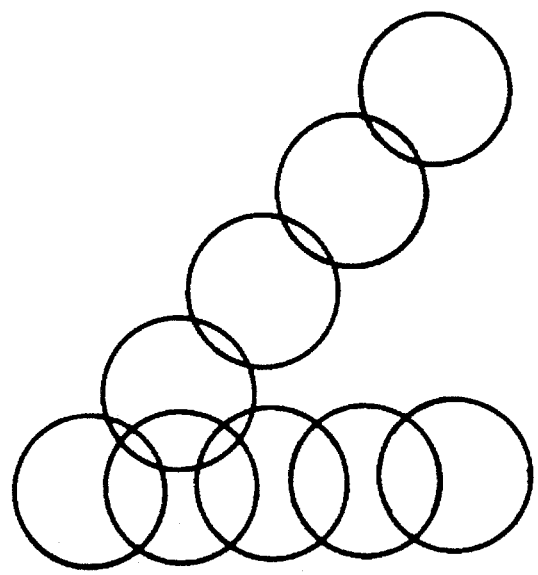
FIG. 7 is a view schematically showing a printed results in the case of the usual printing according to a non-impact printer.
Figure 8:
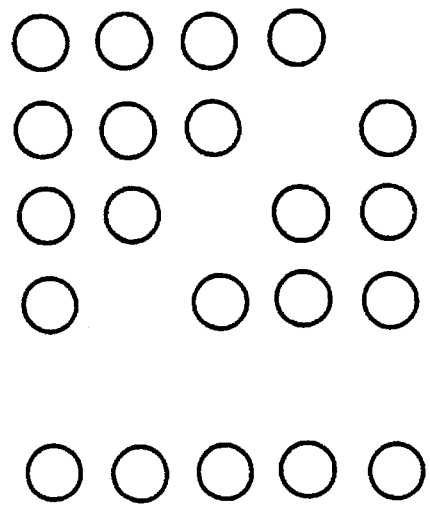
FIG. 8 is a view showing also schematically printing data representing dots in the case of a high duty printing according to a non-impact printer.
Figure 9:
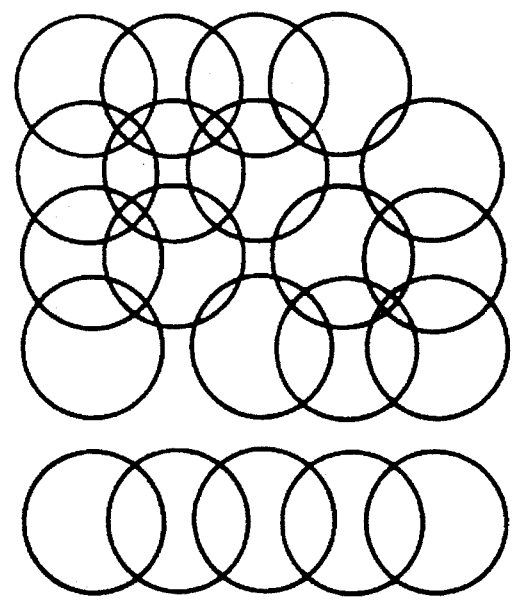
FIG. 9 is a view schematically showing a printed result in the case of the high duty printing according to a non-impact printer.
Figure 16:
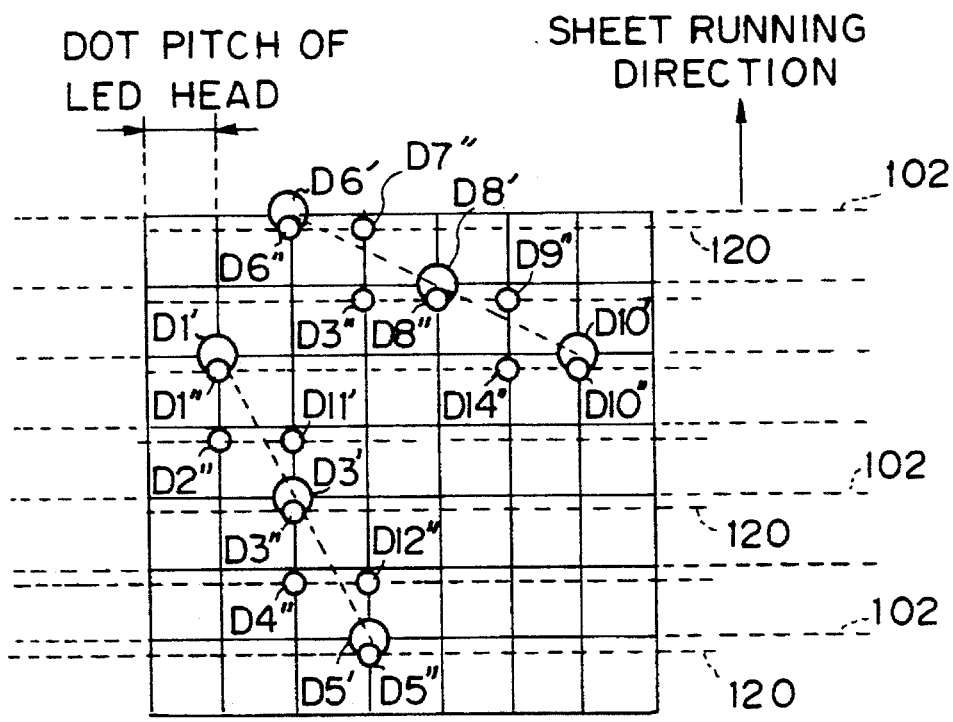
FIG. 16 is a view explanatorily showing a printed result according to a non-impact printer of the present invention.

Next, there will be discussed such a case where a piece of additional raster line 120 is added between the basic raster lines 102, referring to FIG. 16. In the non-impact printer according to the embodiment of the present invention, an area of N (lines) ×N (dots), such as 5×5 centering dot D1 as shown in FIG. 5, is determined on the basis of the data stored in the N-line buffer 110. As a result, if there exists a slash to be printed as shown in FIG. 5, the logical operation for the raster data is performed by the logical operation circuit 35. The data produced by the logical operation circuit 35 are transmitted as the real print data signal 37 to the print head 19.

In this case, the logical operation circuit 35 performs, on the basis of the presence/absence of data within the N×N are a centering a lattice on the noticed basic raster line 102, determination as to whether a dot is to be formed on the lattice, and in addition as to whether a dot is to be formed on a lattice on an additional raster line 120 adjacent to the basic raster line 102. Such a determination is performed for all the lattices on all the basic raster lines 102.

For example, a dot D1 as shown in FIG. 5 is determined in the N×N area centering the dot D1, and converted into dot D1' on the basic raster line 102 and dot D1" on the additional raster line 120. A dot D2 is determined in the N×N area centering the dot D2, and converted into dot D2" on the additional raster line 120. Further, a lattice L20 is determined in the N×N area centering the lattice L20, and converted into dot D11" on the additional raster line 120. Thus, the print data arithmetic and logic circuit 16 produces, upon receipt of the video data signal 14 having the same structure as the prior art one from the control unit 1, the raster data shown in FIG. 16 in the logical operation circuit 35.

The timing circuit 34 generates an additional printing timing during an interval of a receiving timing of the video signal 11 received from the other or external controller. More specifcally, the line timing signal 12b is frequency divided to output an additional line signal 38 to the logical operation circuit 35. Upon receipt of the additional line signal 38, the logical operation circuit 35 outputs the resultant data subjected to the logical operation and transmits it to the print head 19, without carrying out theological operation. Thereafter, the latch signal 36 is sent out to hold the real printing data signal 37 in the print head 19.

The thus held real printing data signal 37 is used for printing, when the print head 19 receives a printing drive signal 13 output from the control unit 1, before receiving a real printing data signal 37 on the next line from the logical operation circuit 35. In order to provide a linearer or straighter image of the slash represented by the thus obtained raster data, a printing drive period of time is set to be differentiated between the case of the dot on the basic raster line 102 and the case of the dot on the additional raster line 120.

As stated above in detail, according to the embodiment of the present invention, the print data arithmetic and logic circuit is provided with the N-line buffer for storing N pieces of line of video data signals in units of lines, the timing circuit for generating the additional line signal during an interval of a receiving timing of the reference line timing signal and the logical operation circuit for performing an logical operation for the data signals in the N-line buffer in accordance with a set logical expression. The logical operation circuit outputs the data signals subjected to the logical operation in the form of the real printing data signal, when receiving the additional line signal. The real printing data signal comprises a component for printing a dot on a basic raster line and a component for printing a dot on an additional raster line set between the basic raster lines. This feature makes it possible to perform a linear or straight image of printing.

Thus, according to the present invention, it is possible to provide a natural printing for a curve, a slash or the like, thereby improving a printing quality.

Figure 13:
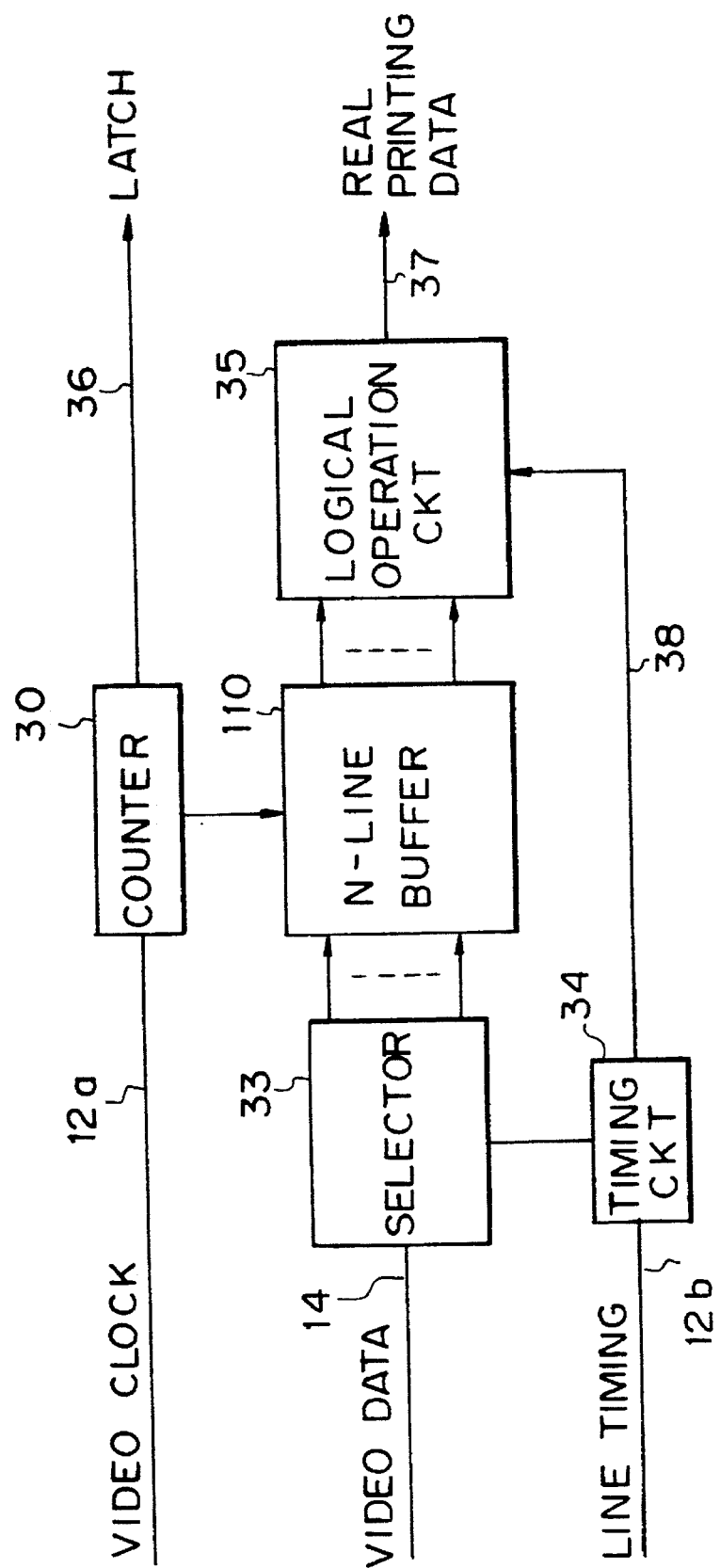
FIG. 13 is a block diagram of a print data arithmetic and logic circuit of an altenative embodiment of the present invention.

In the print data arithmetic and logic circuit 16 as shown in FIG. 13, applied to the logical operation circuit 35 are N dots of continuous raster data on each of N lines from the N-line buffer 110. The logical operation circuit 35 is provided with means for comparing the entered N×N dots of continuous raster data with a dot pattern which has been previously defined in the logical operation circuit 35.

Figures 17A, 17B, 17C:
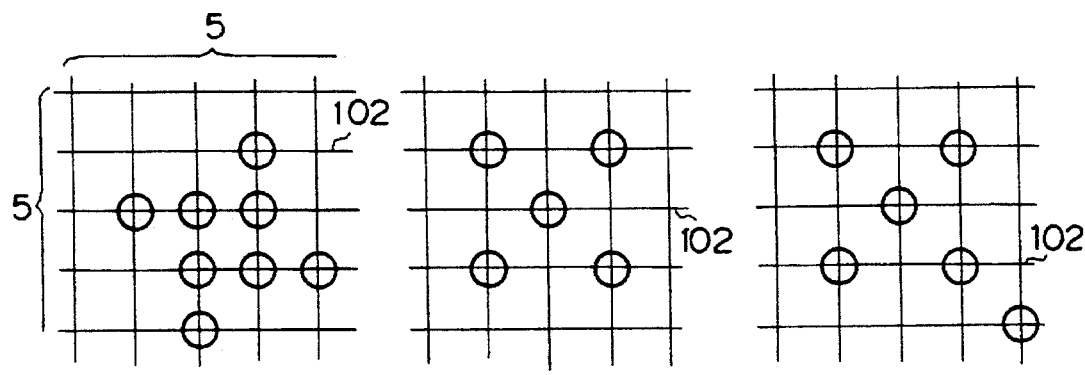
FIGS. 17A, 17B and 17C are views showing by way of example dot patterns defined in a logical operation circuit.

FIGS. 17A, 17B and 17C are views showing by way of example dot patterns defined in a logical operation circuit 35. In those cases, the value of N in the N-line buffer 110 is given with "5", and there are shown 5×5 dots of continuous raster data. FIGS. 17A, 17B and 17C show a fattening 8-step basis, a Bayer 5-step basis and a Bayer 6-step basis, respectively.

The logical operation circuit 35 determines whether or not a conversion of a dot corresponding to the center of an area of N×N dots of continuous raster data is performed. More specifically, the raster data is compared with the defined dot pattern, and if not coincident, it is recognized that the N×N dots of raster data is not one which constitutes a part of a tone representation. Thus, the video data signal 14 transferred from the control unit 1 is transferred in the form of the real printing data signal 37 to the print head 19 as it is.

If the N×N dots of raster data is coincident with the defined dot pattern, on the other hand, it is recognized that the N×N dots of raster data is one which constitutes a part of a tone representation. Thus, the video data signal 14 transferred from the control unit 1 is converted and then transferred in the form of the real printing data signal 37 to the print head 19. While the video signal 14 before the conversion, which is entered from the control unit 1, is of a structure for indicating whether dots are to be formed on the basic raster lines determined by resolution of an apparatus, the data after the conversion or the data produced by the logical operation circuit 35 is of a structure for indicating whether a dot on the basic raster line is deleted and dots are to be formed on x pieces of additional raster line between the adjacent basic raster lines 102. In a case where the dots are printed on pieces of additional raster line, a driving energy in a driving period of time is previously set at a value with which an optimum tone representation is provided by the dots printed on the additional raster lines 120.

Figure 18:
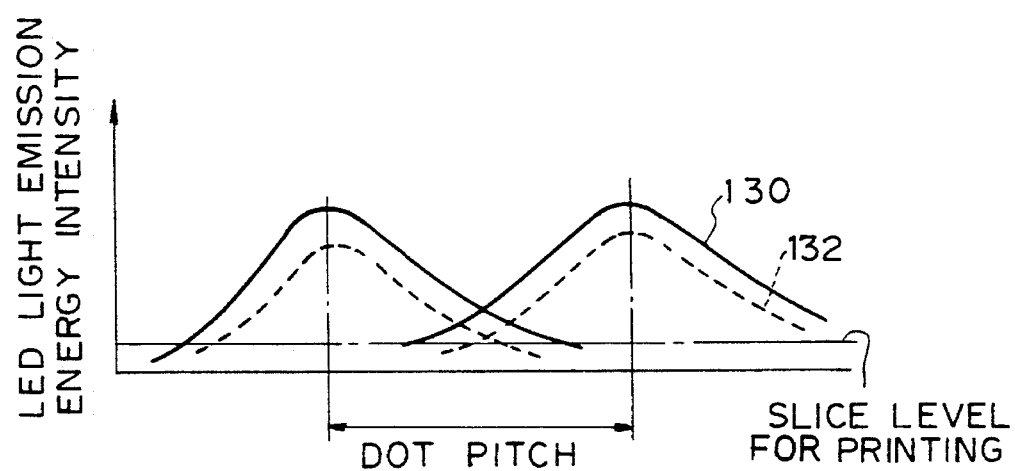
FIG. 18 plots in a comparison view LED light emission energy intensity in the cases of a usual drive and a tone representation optimizing drive.

FIG. 18 is a comparison view in LED light emission energy intensity in the cases of a usual drive and a tone representation optimizing drive. In FIG. 18, a solid line 130 plots LED light emission energy intensity in the case of a usual drive, and a broken line 132 indicates LED light emission energy intensity in the case of a tone representation optimizing drive. The LED light emission energy intensity is adjusted in such a manner that the driving time for printing of a dot on the individual additional raster line 120 is set in accordance with a distance between the adjacent dots, or a dot pitch. Setting of the longer printing drive time provides the longer exposure time for a surface of the photoconductor drum, and thus an amount of electric charge discharged from the surface of the photoconductor drum becomes large in accordance with an amount of exposure, so that an amount of deposited toner becomes large, thereby providing a large dot diameter.

In the case where there is set such an LED light emission energy intensity that an optimum tone representation is provided as shown by the broken line 120, an overlapping area of the adjacent dots is reduced, and thus it is possible to suppress the print density of portions upon Which dots concentrate.

Figure 19:
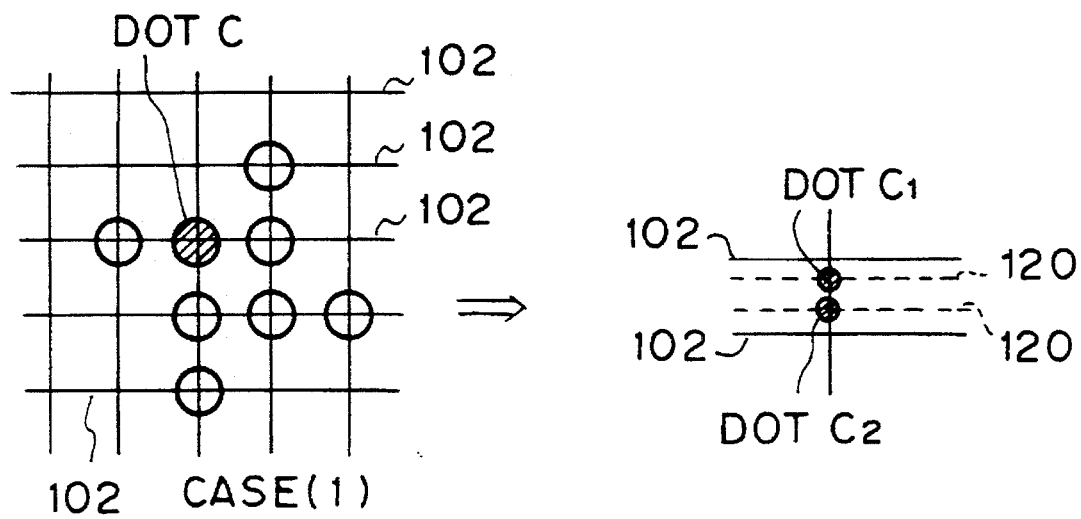
FIG. 19 schematically shows a data conversion state in the logical operation circuit.
Figure 20:
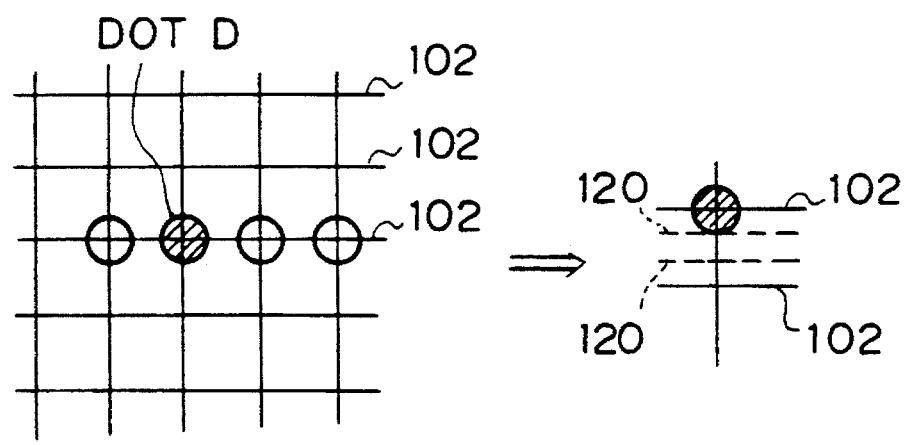
FIG. 20 schematically shows another data conversion state in the logical operation circuit.

FIG. 19 is a view showing a data conversion state in the logical operation circuit, and FIG. 20 is a view showing another data conversion state in the logical operation circuit. In case of FIG. 19, the N×N dots of raster data are coincident with the defined dot pattern, and thus dot C on the basic line 102 located in the center is converted into dots $C_1$ and $C_2$ on the additional raster lines 120, the number of which is "2" in the present instance. In case of FIG. 20, the N×N dots of raster data are not coincident with the defined dot pattern, and thus dot D on the basic line 102 located in the center is not converted and is transmitted to the print head 19 as it is. In this case, no dot is formed on the additional raster lines 120.

Next, there will be described an operation in the case where high duty printing is performed, that is, printing which involves a very large number of dots in a printing picture, such as a reversed printing or hollow character printing. The logical operation circuit 35 receives N dots of continuous raster data on each of N lines from the N-line buffer 110. The logical operation circuit is provided with means for comparing the entered N×N dots of continuous raster data with a dot pattern which has been previously defined in the logical operation circuit 35. The logical operation circuit 35 produces resultant data corresponding to the center of the area by means of the logical operation. While the video signal 14, which is entered from the control unit 1, is of a structure for indicating whether dots are to be formed on the basic raster lines 102 determined by resolution of an apparatus, the data produced by the logical operation circuit 35 is of a structure for indicating whether dots are to be formed on the basic raster lines 102, and in addition indicating whether dots are to be formed on x pieces of additional raster line between the basic raster lines 102. The thus produced data are transmitted in the form of the real print data signal 37 to the print head 19.

Figure 21:
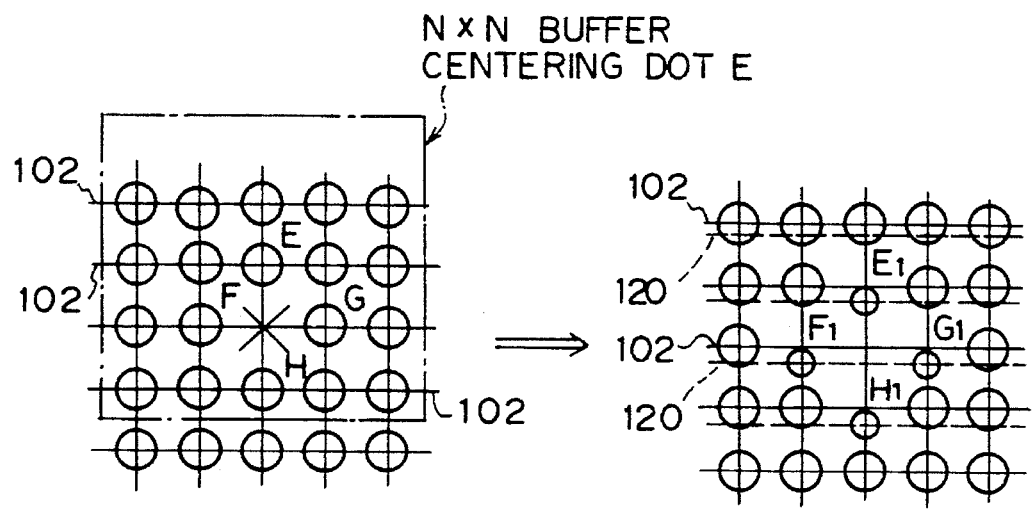
FIG. 21 shows schematically a data conversion state in the logical operation circuit in the case of high duty printing.
Figure 22:
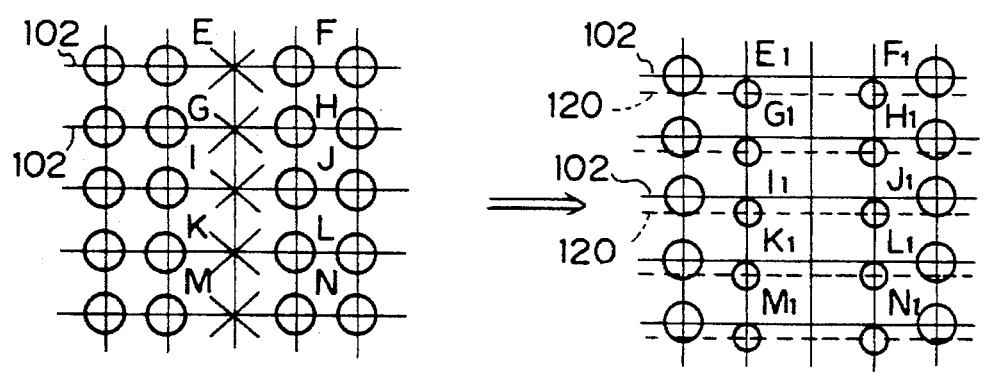
FIG. 22 shows schematically another data conversion state in the logical operation circuit in the case of high duty printing.
Figure 23:
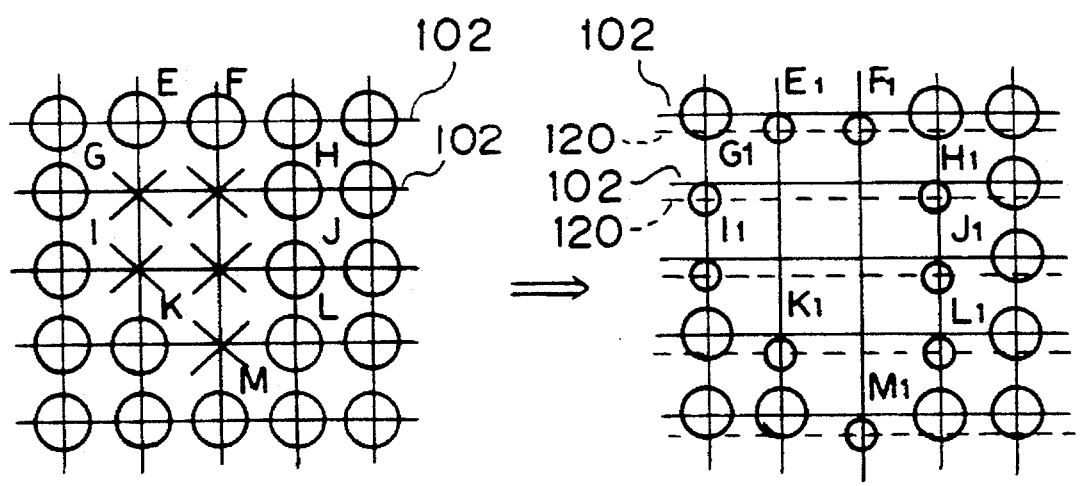
FIG. 23 shows also schmatically a further data conversion state in the logical operation circuit in the case of high duty printing.

FIG. 21 is a view showing a data conversion state in the logical operation circuit in the case of high duty printing, FIG. 22 is a view showing another data conversion state in the logical operation circuit in the case of high duty printing, and FIG. 23 is a view showing a further data conversion state in the logical operation circuit in the case of high duty printing. In those cases, the value of N in the N-line buffer 110 is given with "5", and there are shown 5×5 dots of continuous raster data. There are shown by way of example the dot patterns at the time of high duty printing, such as a dot pattern having an independent non-printing part, a dot pattern having a blank strip line, and a dot pattern enclosing a blank strip character or letter. Those dot patterns at the time of high duty printing are previously defined in a logical operation circuit 35.

In the case of FIG. 21, in the N×N dots of raster data, a non-printing part is located adjacent to a dot E located at the center. Thus, the dot E on the basic raster line 102 is deleted, and a dot $E_1$ is added on the additional raster line 120. Similarly, processing for dots F-H is performed, so that the dots F-H on the basic raster lines 102 are deleted, and dots $F_1$-$H_1$ are added on the additional raster lines 120.

In case of FIG. 22, a non-printing part is detected as a straight line. Similar to the case of FIG. 21, the dots E-N on the basic raster lines 102 are deleted, and dots $E_1$-$N_1$ are added on the additional raster lines 120.

Also, in case of FIG. 23, similarly, the dots E-M on the basic raster lines 102 are deleted, and dots $E_1$-$M_1$ are added on the additional raster lines 120. Setting of driving energy for printing dots on the basic raster lines 102 is independent of setting of driving energy for printing dots on the additional raster line 120.

Figure 24:
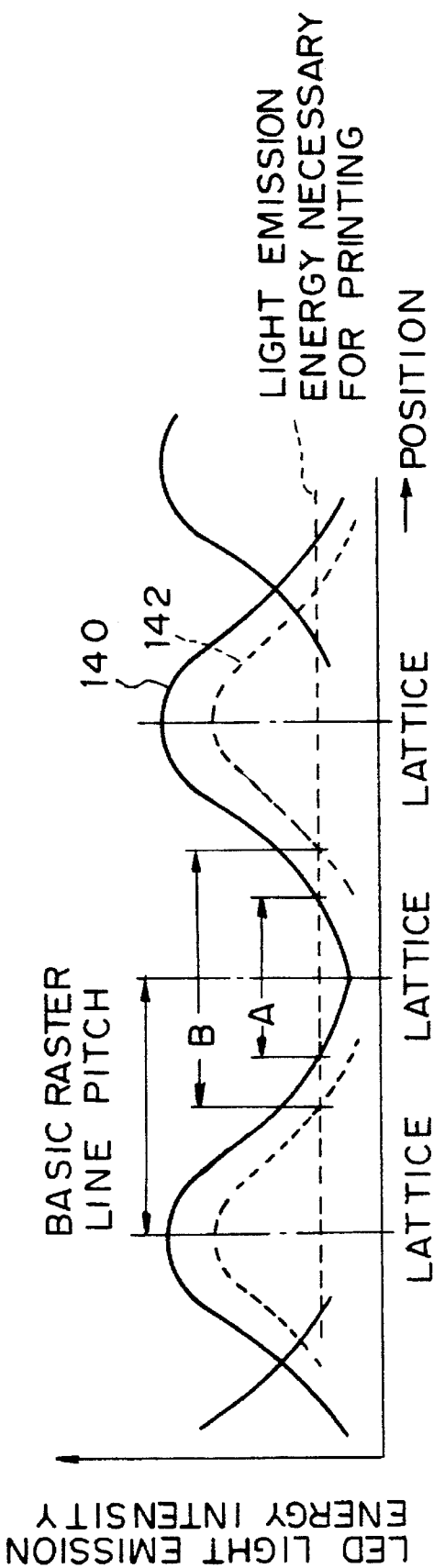
FIG. 24 plots in a comparison view LED light emission energy intensity in the cases of a usual drive and a reversed printing optimizing drive.

FIG. 24 is a comparison view in LED light emission energy intensity in the cases of a usual drive and a reversed printing optimizing drive. In FIG. 24, a solid line 140 indicates LED light emission energy intensity in the case of a usual drive, and a dotted line 142 indicates LED light emission energy intensity or level in the case of a reversed printing optimizing drive. In the figure also, A and B denotes the non-printing distance in the cases of optimizing drive and usual drive, respectively.

As shown in FIG. 24, the driving energy is previously set so that a clearance of the non-printing part is equal to a lattice length of the basic raster line 102, that is, a resolution pitch with which an apparatus is provided. Such a processing provides an equivalence of a remaining amount of the non-printing part during the high duty printing to the resolution pitch, thereby providing distinction.

According to the illustrative embodiment as mentioned above, while there has been described a case where only dots adjacent to the non-printing part are converted, it may be so arranged that the conversion of the printing part also is performed, and an addition value of a driving time, for dots on the basic raster line and a driving time for dots on the additional raster line are controlled to obtain a printing dot form at the time of the usual driving.

Figure 25:
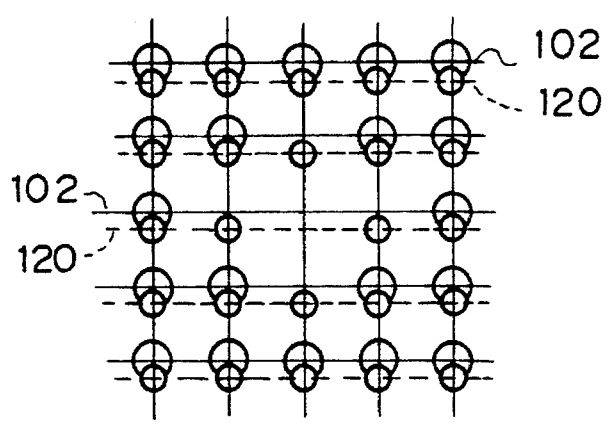
FIG. 25 schematically shows a data conversion state in a case where drive time for dots on basic raster lines is changed in the high duty printing.
Figure 26:
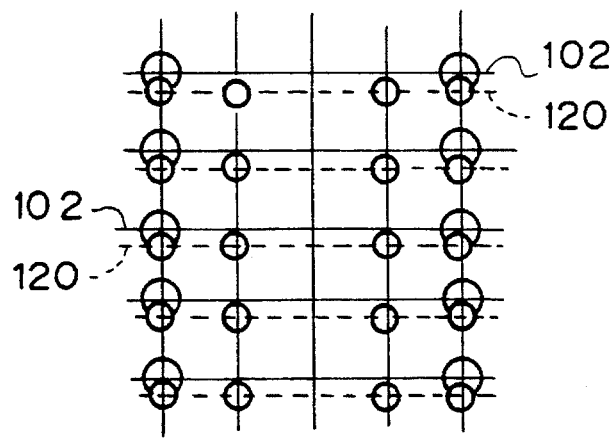
FIG. 26 shows another data conversion state in a case where drive time for dots on basic raster lines is changed during the high duty printing.
Figure 27:
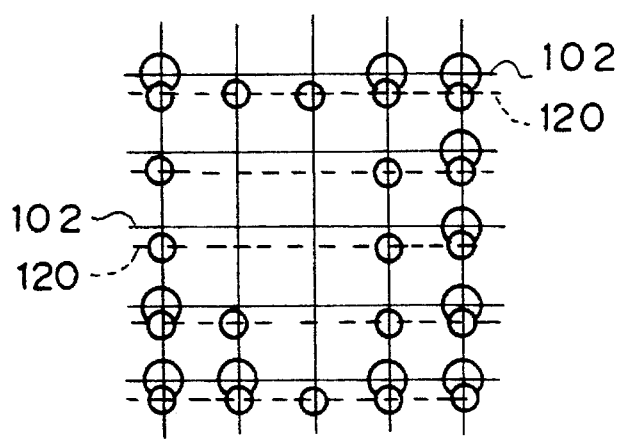
FIG. 27 shows a further data conversion state in a case where drive time for dots on basic raster lines is changed in the high duty printing.

FIG. 25 is a view showing a data conversion state in the case where a drive period of time for dots on the basic raster lines 102 is changed in the case of the high duty printing, FIG. 26 shows another data conversion state in the case where a drive period of time for dots on the basic raster lines 102 is changed during the high duty printing, and FIG. 27 shows a further data conversion state in the case where a drive time period for dots on the basic raster lines 102 is changed in the case of the high duty printing.

As shown in FIGS. 25, 26 and 27, according to those illustrative embodiments, an arithmetic operation is performed for dots on the printing portion other than dots adjacent to the non-printing portion. More specifically, regarding the dots adjacent to the non-printing portion, the dots on the basic raster line 102 are deleted and the dots after the conversion are added on the additional raster line 120, and in addition, regarding the dots on the printing portion, not only the dots after the conversion are added on the additional raster line 120, but also the dots after the conversion are retained on the basic raster line 102.

As stated above in detail, according to the embodiment of the present invention, the print data arithmetic and logic circuit is provided with the N-line buffer for storing N pieces of line of video data signals in units of lines, the timing circuit for generating the additional line signal during an interval of timing in which the reference line timing signal is received, and the logical operation circuit for comparing the raster data on a specific area formed based on data in the N-line buffer with a dot pattern which has been previously defined in the logical operation circuit and performing a logical operation. The logical operation circuit outputs the data signals subjected to the logical; operation in the form of the real printing data signal, when receiving the additional line signal. The real printing data signal comprises a component for printing a dot on a basic raster line 102 and a component for printing a dot on an additional raster line 120 set between the basic raster lines 102. Setting of driving time for printing dots on the basic raster lines 102 is independent of setting of driving time for dots on the additional raster line 120. Those features make it possible to obtain an optimum printing quality either in case of printing of a character, a letter, a line and the like or in case of a tone representation.

Further, according to the present invention, it is possible not only to provide a clear distinction between a non-printing part and a printing part at the time of a high duty printing, but also to obtain an optimum printing quality either in a usual printing mode or a high duty printing mode.

Figure 28:
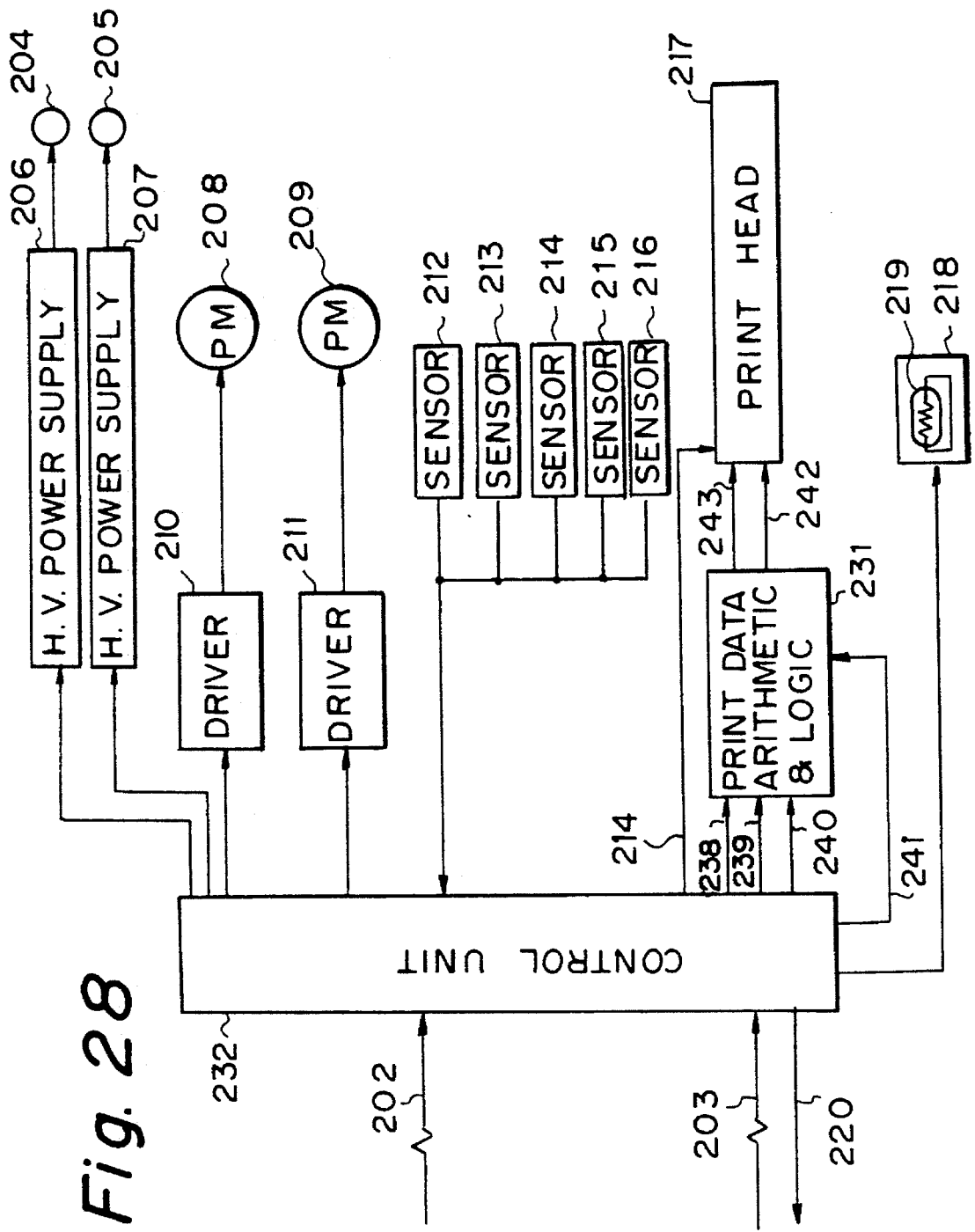
FIG. 28 is a block diagram showing an alternative embodiment of the present invention.

Next, a further embodiment of a printer of the invention will be described with reference to the drawings in detail. FIG. 28 is a block diagram showing another embodiment of the present invention, and FIG. is a block diagram of a print data arithmetic and logic circuit according to the embodiment. In FIG. 28, a printer shown includes an array of LEDs (light emitting diodes) as a latent image forming means. Such a printer may be a non-impact printer, and particularly a printer wherein a printing is performed in a dot configuration on each line substantially perpendicular to sheet a running direction. In FIG. 28, a control unit 232 comprises a microprocessor, a ROM, a RAM, input/output ports, a timer and the like components, and provides a sequence control for the printer in its entirety in response to control signals 202 and a video signal 203 from another, external controller, not shown.

The control unit 232 is connected to high voltage power supplies 206 and 207, which are connected to a developing unit 204 and a transfer unit 205, respectively, and also connected to drivers 210 and 211 for driving stepping motors 208 and 209, respectively. The stepping motor 208 is for driving an electrophotographic process unit, and the stepping motor 209 is a motor for sheet feed. The control unit or main control 232 is also connected to the respective sensors 212–216, a print head 217 and a fuser 218. The sensors 212, 213, 214, 215 and 216 are a sheet inhalation inlet sensor, a sheet delivery outlet sensor, a sheet remaining amount sensor, a sheet size sensor and a fuser temperature sensor, respectively. A print head 217 is arranged with LED's and is adapted to expose a photoconductor surface, not shown, in accordance with data to be printed. A fuser 218 is provided with a heater 219 for fusing a toner transferred on a sheet.

Upon receipt of a print instruction included in the control signals 202, the control unit 232 first causes a fuser temperature sensor 216 to determine whether or not a fuser 218 including a heater 219 is in an available temperature range, and if not, turns on the heater 219 to heat the fuser 218 up to an available temperature. Next, the stepping motor 208 is is driven through a driver 210 and simultaneously a high voltage power sources 206 and 207 are turned on so that the developing unit 204 and the transfer unit 205 are in a ready condition for printing.

A print data arithmetic and logic circuit 231 is connected to the control unit 232 and also to the print head 217. The print data arithmetic and logic circuit 231 produces additional print data, which will be described later detail, based on print data entered from the control unit 232 to transmit the same to the print head 217. Applied to the print data arithmetic and logic circuit 231 are video clock signal 238, video data signal 239, line timing signal 240 and mode select signal 241 from the control unit 232.

Figure 29:
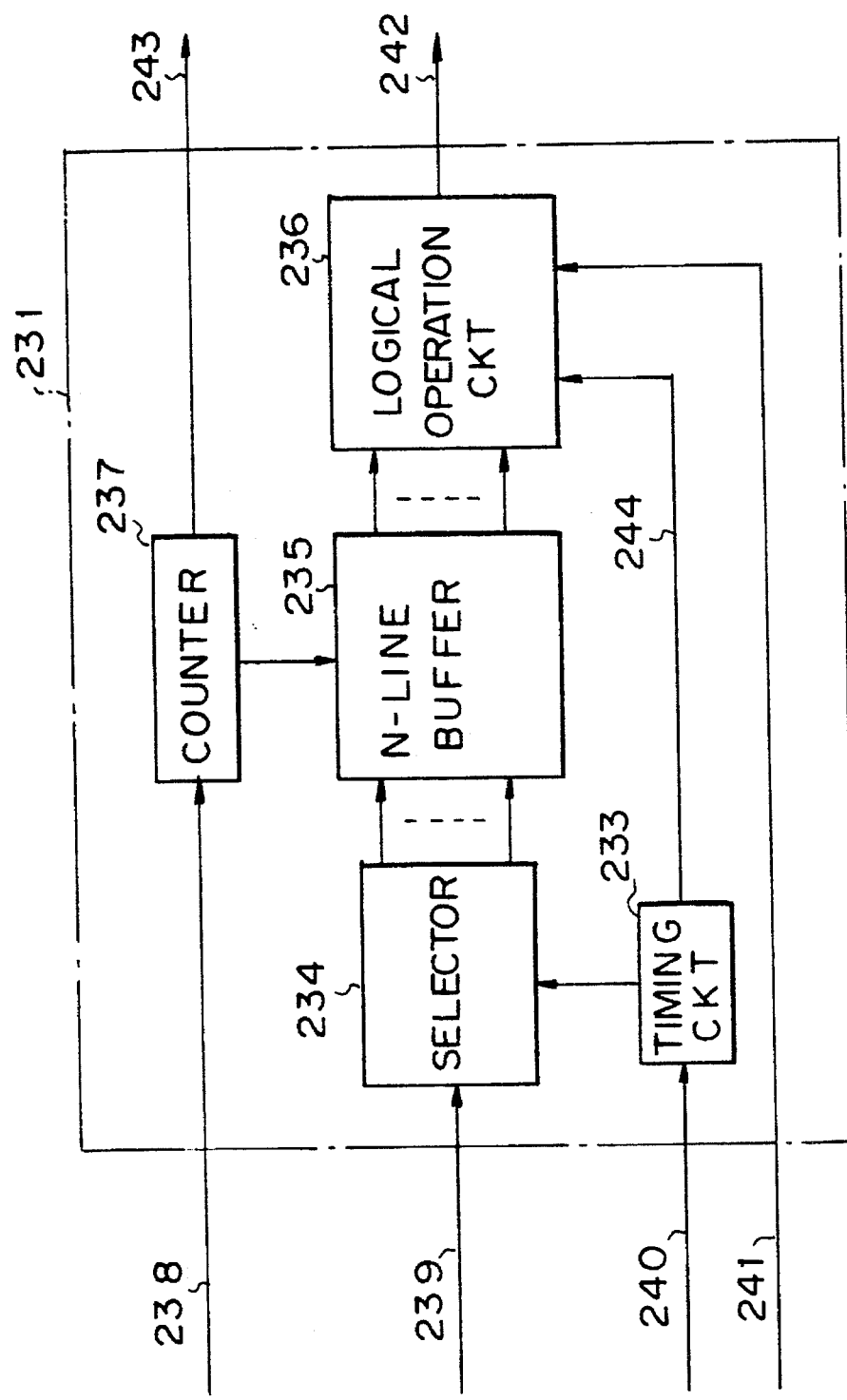
FIG. 29 is a block diagram, similar to FIG. 1, of a print data arithmetic and logic circuit according to the embodiment shown in FIG. 28.

In FIG. 29, the print data arithmetic and logic circuit 231 comprises a timing circuit 233, a selector 234, an N-line buffer 235, a logical operation circuit 236 and a counter 237. The timing circuit 233 produces and transmits a selection signal to the selector 234. Upon receipt of the selection signal, the selector 234 selects a line buffering location from among the N-line buffer 235 in which the entered video data signal 239 is to be stored. The N-line buffer 235 includes a plurality of line buffering locations adapted for storing the print data entered from the control unit 232 in units of lines. The logical operation circuit 236 may be constructed with a delay circuit, an OR circuit, an AND circuit and the like logical circuits, and produces additional print data, which will be described after in detail, based on a plurality of lines of print data. The logical operation circuit 236 serves, upon receipt of the mode select signal 241, to perform a mode selection. The counter 237 produces addresses for storage of the print data into the N-line buffer 235.

When the respective sections of the apparatus are in condition ready for print, the control unit 232 transmits a timing signal 220 to the other controller, not shown, which is located upstream with respect to a data flow, and receives the video signal 203 as the data to be printed. The received video signal 203 is transmitted from the control unit 232 to the print data arithmetic and logic circuit 231.

Figure 30:
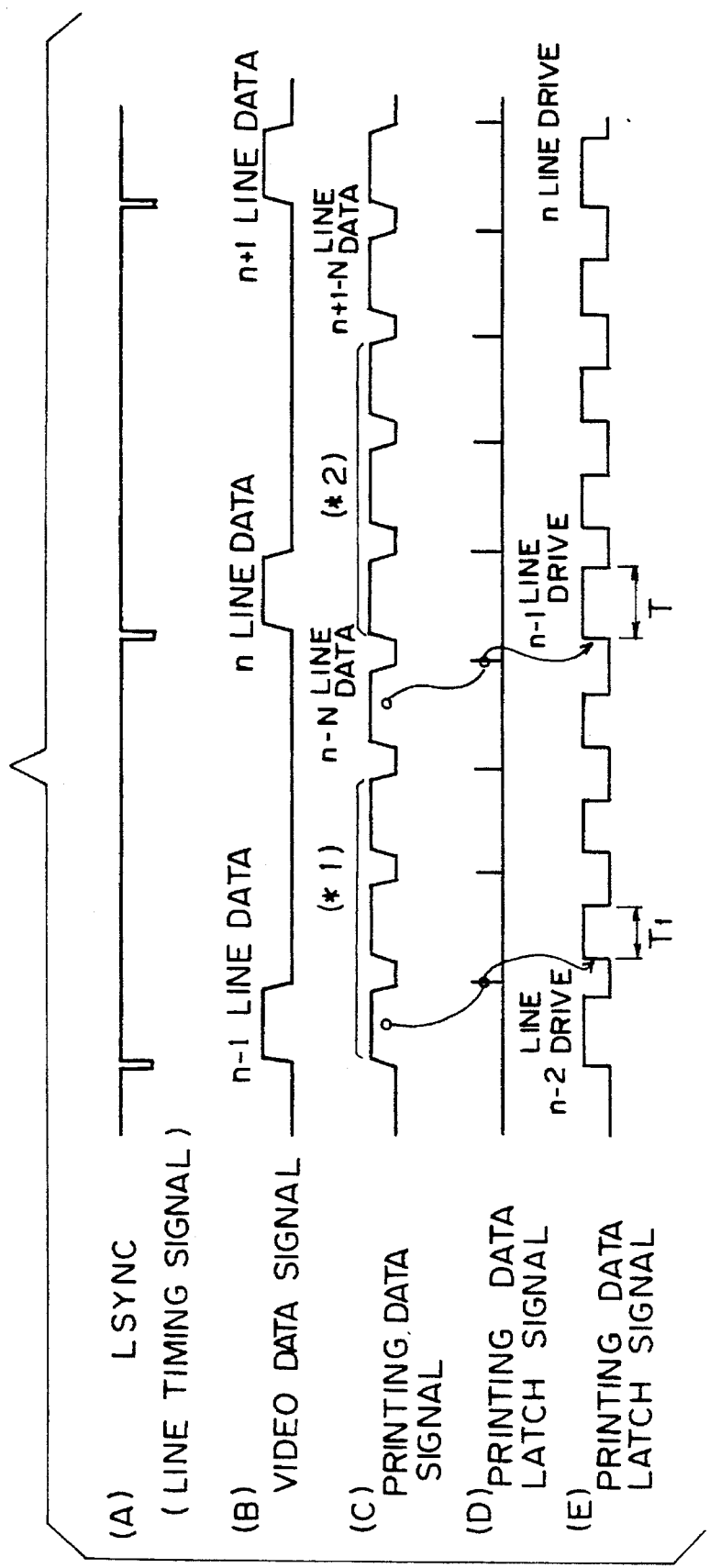
FIG. 30 is an operational time chart for the embodiment of the present invention shown in FIG. 28.

Upon receipt of the timing signal 220, the control unit 232 transmits a line timing signal 240 to the timing circuit 233 in the print data arithmetic and logic circuit 231, see part (A) of FIG. 30. Thus, the timing circuit 233 produces a timing for receiving the video data signal 239. The selector 234 selects a line buffering location, into which the received video data signal 239 is stored, from among the N-line buffer 235, and causes the video data signals 239 to be stored in the selected line buffering location in order. The video signal 203 is transmitted on a line-by-line basis (part (B) of FIG. 30). The video signal 203 shown in FIG. 28 is applied together with the video clock signal 238 as the video data signal 239 through the control unit 232 to the print data arithmetic and logic circuit 231. The video data signal 239 carries print data.

Addresses for storage of the print data carried by the video data signal 239 into the line buffering location selected from among the N-line buffer 235 are generated by means of counting video clock signals 238 by a counter 237.

The N-line buffer 235 comprises N pieces of line buffer, or line buffering locations, each storing therein a line of print data. Line buffering locations other than one in which: the print data is now stored have stored the previously entered print data. That is, now assuming that the now entered print data is stored in a line buffering location or line buffer #1, the print data to the nearest (N–1) th line have been stored in line buffering locations #2 to #N.

The logical operation circuit 236 reads out from the N-line buffer 235 the print data stored in the now selected line buffering location and the print data stored in the line buffering location before (N–1)th line, and performs an arithmetic operation to generate additional print data. This operation will be described in detail referring to FIG. 31 hereinafter.

Figure 31:
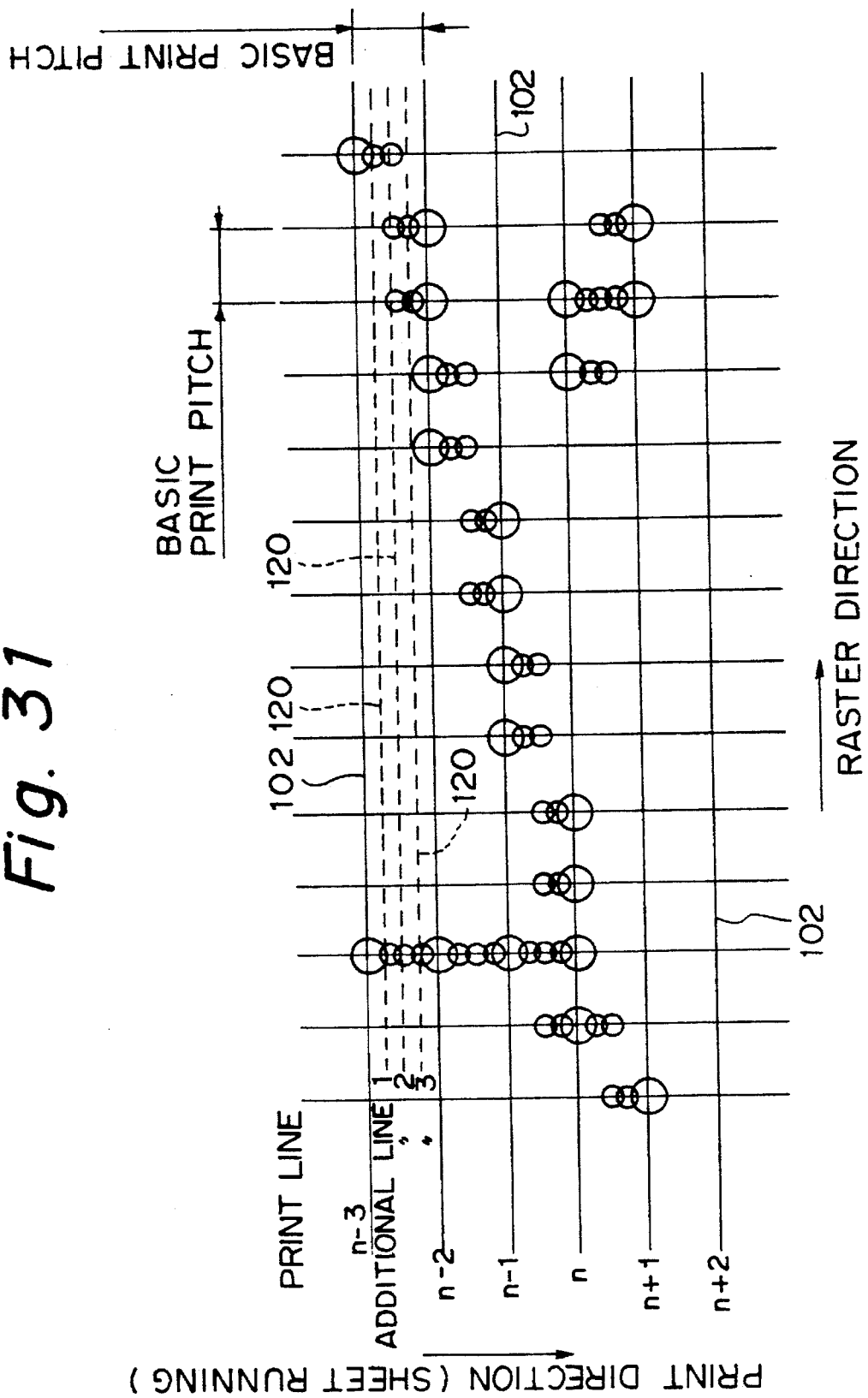
FIG. 31 shows a printing pattern established according to the embodiment of the present invention shown in FIG. 28.

In FIG. 31, print lines are arranged in a print direction or sheet running direction, and the print data transmitted from the other, external controller, not shown, are printed as the basic print data on the print lines maintaining basic print pitches in the sheet running direction and in a raster direction. In the figure, a larger and a smaller circle denotes basic and additional print data, respectively. According to the present embodiment, there are provided a plurality of additional lines (in FIG. 31, three lines) between the lines, and additional print data are printed also on those additional lines. The additional print data to be printed on each of the additional lines are obtained by the arithmetic operation of the logical operation circuit 36. Logical expressions for obtaining the additional print data to be printed on each of the additional lines are set forth below.

Logical expressions for additional print data on the M-th bit of the additional lines:

Additional line #1:
$$X^n_{n+1}(1,M) = X_n(M) \cdot [X_{n+1}(M+1) + X_{n+1}(M) +$$
$$X_{n+1}(M+1)] + [X_n(M-1) \cdot X_n(M) \cdot X_n(M-1)] \cdot$$
$$[X_{n+1}(M-2) + X_{n+1}(M+2)]$$

Additional line #2:
$$X^n_{n+1}(2,M) = X^n_{n+1}(1,M) + X^3_{n+1}(3,M)$$

Additional line #3:
$$X^m_{n+1}(3,M) = X_{n+1}(M) \cdot [X_n(M-1) + X_n(M) + X_n(M+1)] +$$
$$[X_{n+1}(M-1) \cdot X_{n+1}(M) \cdot X_{n+1}(M+1)] \cdot$$
$$[X_n(M-2) + X_n(M+2)]$$

Where $X_{n+1}^n$ (S, M) denotes data on the S-th additional line between line n and line n+1 and the M-th bit in a raster direction; and $X_n$ (M) denotes data on line n and the M-th bit in a raster direction.

When the additional print data on the additional line #1 is produced, it is transmitted as print data 242 to the print head 217, see part (C) in FIG. 30. In the figure, *1 denotes logical operation data with data from the the (n−N)th line to the (n−1)th line, and *2 denotes logical operation data with data from the (n−N+1) th line to the n−th line. When a line of additional print data is transferred, print data latch signal 243 is transmitted from the counter 237 to the print head 217 (part (D) of FIG. 30). The additional print data is held in the print head 217 by the print data latch signal 43. The held additional print data is formed as a latent image on a photoconductor body, not illustrated, when the print head 217 is driven by a print driving signal 224 supplied from the control unit 232. In this case, the driving time period is given as T1 (part (E) of FIG. 30).

Similarly, when the additional print data on the additional line #2 and the additional print data on the additional line #3 are produced by the logical operation circuit 236, they are transmitted as print data 242 to the print head 217 and formed as a latent image on the photoconductor body.

When all of the additional print data have been transferred to the print head 17, the timing circuit 233 outputs an additional line signal 244 to the logical operation circuit 236. Upon receipt of the additional line signal 244, the logical operation circuit 236 reads out the basic print data, which has been previously stored in the N-line buffer 235, from the associated line buffering location, and transfers the same to the print head 217 as it is. The print data latch signal 243 is transmitted from the counter 237 to the print head 217 (part (D) of FIG. 30). The transferred basic print data is held in the print head 217 by the print data latch signal 243. The held basic print data is formed as a latent image on the photoconductor body when the print head 217 is driven by the print driving signal 224 supplied from the control unit 232. In this case, assuming that the driving time of the print head 217 is given as T (part (E) in FIG. 30), the driving time is controlled to satisfy T≧T1, in comparison with the driving time T1 for the additional print data as mentioned above. According to such a control, an energy required for printing in case of the additional print data is reduced compared with in the case of the basic print data, so that a smaller diameter printing dot may be provided thereby avoiding a difference in printing density between both the cases or modes. Thus, as shown in FIG. 31, the printing dots are formed as the latent image on the photoconductor body.

According to the present embodiment, the operation of the print data arithmetic and logic circuit 231 may be switched in accordance with a mode select signal 241 transmitted from the control unit 232, so that the operational processing by the logical operation circuit 236 is stopped, if no additional printing is performed, to transfer only the basic print data to the print head 217.

Information printed by the print head 217 is formed on the photoconductor drum, not shown, charged in negative potential as an electrostatic latent image with dots elevated in potential. A toner image is formed by providing electrostatic adhesion of a toner charged in negative potential to the respective dots. The toner image is transmitted to a transfer section in which the toner image is transferred, by a transfer unit 205 having a high voltage source of a positive potential generated by a high voltage power supply 207, to a sheet passing through a clearance between the photoconductor drum and the transfer unit 205. The sheet having the transferred toner image is carried in a contact relation with the fuser 218 including the heater 219, so that the toner image is fixed on the sheet by heat of the heater 219. The sheet having the fused image is further carried and delivered from the printing device of the printer through a sheet delivery outlet sensor 13 to the outside of the printer.

According to the present embodiment, the additional print data is printed three times. However, the number of printing times is not restricted to this number and may be set as desired.

As stated above in detail, according to the embodiment of the present invention, a plurality of additional print data may be printed between the adjacent lines, so that a configuration of the print dots are varied in accordance with the number of printing times of the additional print data. Thus, according to the present invention, it is possible to provide a natural printing for a curve, a slash or the like, thereby improving a printing quality.

Further, according to the embodiment of the present invention, the print head is adapted, in a case where the additional print data is printed, to provide a shorter printing drive time, compared with that in the case where the basic print data is printed, thereby avoiding a difference in printing density between both the cases or modes.

Furthermore, according to those illustrative embodiments of the present invention, shown and described above, the basic print data are subjected to the logical operation at the printer, and thus a controller, which is located upstream with respect to a data flow direction, may avoid effects of logical operation processing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A printer comprising:

control means for providing sequence control for the printer in its entirety in response to a control signal and a video signal from another controller, the control means outputting printing data signals, reference line timing signals, video clock signals, and video data signals;

a printer head adapted for latching and printing printing data signals transmitted from said control means; and print data arithmetic and logic circuit means for providing a logical operation processing on video data signals and counting video clock signals transmitted from said control means, wherein said print data arithmetic and logic circuit means includes storage means for storing video data signals transmitted from said control means, selector means responsive to reference line timing signals for selectively alternately outputting the video data signals representing a reference line under control of said other controller, additional line signal generating means for generating, from video signals received from said control means, a video data signal representing an additional line between reference lines, during an interval of a reference line timing signal, and a logical operation circuit for performing a logical operation on video data signals read out from said storage means and supplying to said printer head the video data signals subjected to the logical operation in the form of printing data signals.

2. A printer according to claim 1, wherein said storage means comprises a first memory and a second memory each adapted for storing the video data signal which carries the printing data signals.

3. A printer according to claim 1, wherein said storage means comprises an N-line buffer for storing the video data signal which carries the printing data signals, N being a natural number.

4. A printer according to claim 1, wherein said print data arithmetic and logic circuit means is controlled to be not operable in accordance with a mode select signal transmitted from said control means so that the logical operational processing is inhibited.

5. A non-impact printer provided with control means for providing sequence control for the printer in its entirety in response to a control signal and a video signal from another controller, comprising:

video clock counter means connected to said control means for generating reference line timing signals;

timing circuit means connected to said control means for generating and outputting an additional printing line timing signal during an interval of a receiving timing of the reference line timing signals and for outputting selection signals;

selection means connected to said control means and said timing circuit means responsive to the reference line timing signals for selectively alternately outputting video data signals representing a reference line in response to the selection signals received from said timing circuit means under control of said other controller;

first memory means connected to said selection means and said video clock counter means for storing video data signals for the reference line in response to an address generated by said video clock counter means;

second memory means connected to said selection means and said video clock counter means for storing video data signals received one line before the reference line in response to an address generated by said video clock counter means;

logical operation circuit means connected to said first memory means, said second memory means and said timing circuit means for performing a logical operation on the video data signals stored in said first and second memory means in accordance with a given logical equation, outputting the video data signals subjected to the logical operation in the form of real printing data signals, and outputting the video data signals stored in said first memory means not subjected to the logical operation in the form of the real printing data signals when receiving the additional printing line timing signal; and a printer head connected to said logical operation circuit means and said control means for performing a printing upon receipt of the real printing data signals from said logical operation circuit means and a printing drive signal from said control means.

6. A non-impact printer according to claim 5, wherein a dot driving time for additional raster lines is shorter than that for basic raster lines.

7. A non-impact printer according to claim 5, wherein said printer head includes means for providing a shorter printing drive time according to the printing drive signal received from said control means.

8. A non-impact printer according to claim 6, wherein the logical operation in said logical operation circuit means is suspended in response to a mode select signal transmitted from said control means.

9. A non-impact printer provided with control means for providing sequence control for the printer in its entirety in response to a control signal and a video signal from another controller, comprising:

video clock counter means connected to said control means for generating reference line timing signals;

timing circuit means connected to said control means for generating and outputting an additional printing line timing signal during an interval of a receiving timing of the reference line timing signals and for outputting selection signals;

selection means connected to said control means and said timing circuit means responsive to the reference line timing signals for selectively outputting the video data signals representing a basic raster line in response to the selection signals received from said timing circuit means under control of said other controller;

N-line buffer means connected to said video clock counter means and said selection means for storing N pieces of video data signals in units of lines in line buffering locations addressed by said video counter means, N being a natural number;

logical operation circuit means connected to said N-line buffer means and said timing circuit means for performing a logical operation on the video data signals stored in said N-line buffer in accordance with a given logical equation, said logical operation circuit means being responsive to the additional printing line timing signal for outputting the data signals subjected to the logical operation in the form of real printing data signals, said logical operation circuit means performing, on the basis of presence/absence of data within an N×N area centering a lattice on the basic raster line, a determination as to whether a dot is to be formed on the lattice and as to whether a dot is to be formed on a lattice on an additional raster line adjacent to the basic raster line; and a printer head connected to said control means and said logical operation circuit means for performing a printing upon receipt of real printing data signals from said logical operation circuit means and a printing drive signal from said control means, wherein the real printing data signals outputted by said logical operation circuit means comprise a component for printing a dot on the basic raster line and another component for printing a dot on an additional raster line to be set between basic raster lines in accordance with the additional printing line timing signal.

10. A non-impact printer according to claim 9, wherein said logical operation circuit means forms a dot on a lattice on a following additional raster line when printing data on a basic raster line and divides a dot on the basic raster line into two additional raster lines when deleting data from the basic raster line.

11. A printer according to claim 9, wherein a drive time for said additional raster lines is shorter than that for said basic raster lines.

12. A non-impact printer provided with control means for providing sequence control for the printer in its entirety in response to a control signal and a video signal from another controller, comprising:

video clock counter means connected to said control means for generating reference line timing signals;

timing circuit means connected to said control means for generating and outputting an additional printing line timing signal during an interval of a receiving timing of the reference line timing signals and for outputting selection signals;

selection means connected to said control means and said timing circuit means responsive to the reference line timing signals for selectively outputting the video data signals representing a basic raster line in response to the selection signals received from said timing circuit means under control of said other controller;

N-line buffer means connected to said video clock counter means and said selection means for storing N pieces of video data signals in units of lines in line buffering locations addressed by said video counter means, N being a natural number;

logical operation circuit means connected to said N-line buffer means and said timing circuit means and comprising comparing means adapted for receiving the video data signals stored in said N-line buffer means as a predetermined plurality of dots of video data signals in units of lines, for determining whether or not a conversion of a dot corresponding to the center of an area of N×N dots of continuous raster data is performed by comparing raster data on a specific area formed on the basis of the video data signals in said N-line buffer with a dot pattern which has been previously defined therein, and performing a logical operation on video data signals in accordance with a result of the comparing, said logical operation circuit, if the N×N raster data is coincident with the previously defined dot pattern, outputting video data signals subjected to the logical operation in the form of real printing data signals, and if the N×N raster data is not coincident with the defined dot pattern, outputting the video data signals without submitting them to the logical operation considering the N×N raster data as apart of a tone representation when receiving the additional printing line timing signal; and a printer head connected to said logical operation circuit means for performing a printing upon receipt of the real printing data signals from said logical operation circuit means and a printing drive signal from said control means, wherein the real printing data signals comprise a component for printing dots on basic raster lines if the N×N raster data is coincident with the defined dot pattern and another component for printing dots on x pieces of additional raster line to be set between the basic raster lines.

13. A non-impact printer according to claim 12, wherein a drive time for said additional raster lines is shorter than that for said basic raster line.

14. A non-impact printer wherein a printing is performed in a dot configuration on a plurality of basic raster lines substantially perpendicular to a sheet running direction, comprising:

storage means for storing basic print data to be printed on the plurality of basic raster lines;

additional print data producing means for producing additional print data to be printed on a plurality of additional raster lines provided between the basic raster lines in accordance with basic print data to be printed on the plurality of basic raster lines read out from said storage means; and timing producing means for producing an additional printing timing for printing the additional print data produced by said additional print data producing means.

15. A printer according to claim 14, wherein said additional print data producing means comprises a logical operation circuit for performing a logical operation on the basic print data read out from said storage means in accordance with a given logical equation.

16. A printer according to claim 15, wherein said printer further comprises control means for providing sequence control for the printer in its entirety in response to a control signal and a video signal from another controller, and the operation of said logical operation circuit is controlled to be not operable in accordance with a mode select signal transmitted from said control means so that the logical operational processing is inhibited.

17. A printer according to claim 15, wherein said logical operation circuit is constructed with a delay circuit, an OR circuit and an AND circuit.

18. A printer according to claim 14, wherein said printer is a printer which is adapted to perform a printing in a dot configuration on each line substantially perpendicular to a sheet running direction.

19. A printer according to claim 14, wherein a drive time for said additional raster lines is shorter than that for said basic raster lines.

20. A non-impact printer provided with control means for providing sequence control for the printer in its entirety in response to a control signal and a video signal from another controller, comprising:

a first memory for storing a current video data signal for a current line;

a second memory for storing a video data signal for one line before the current line;

means for generating reference line timing signals;

means for generating an additional line signal during an interval of a receiving timing of the reference line timing signals;

selection means responsive to the reference line timing signals for selectively alternately outputting a video data signal to said first and second memories;

a logical operation circuit for performing a logical operation for the video data signals stored in said first and second memories in accordance with a given logical expression, said logical operation circuit outputting video data signals subjected to the logical operation in the form of real printing data signals, and outputting video data signals not subjected to the logical operation in the form of real printing data signals when receiving the additional line signal; and a print head for performing a printing operation upon receipt of the real printing data signals from said logical operation circuit and a printing drive signal from said control means;

wherein additional dots are provided in cases where (1) there is a dot at the same raster point on lines before and/or after a line of interest, (2) there is a dot at the raster point displaced left and/or right by one dot in a raster direction on lines before and/or after a line of interest, and (3) there are dots at three successive raster points on a line of interest and in addition there is a dot at the raster point displaced left and/or right by two dots from the center in a raster direction on lines before and/or after a line of interest.

* * * * *